(12) United States Patent
Lyu et al.

(10) Patent No.: US 12,236,614 B2
(45) Date of Patent: Feb. 25, 2025

(54) SCENE SEGMENTATION AND OBJECT TRACKING

(71) Applicant: QUALCOMM Incorporated, San Diego, CA (US)

(72) Inventors: Jiancheng Lyu, San Diego, CA (US); Dashan Gao, San Diego, CA (US); Yingyong Qi, San Diego, CA (US); Shuai Zhang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/828,962

(22) Filed: May 31, 2022

(65) Prior Publication Data

US 2023/0386052 A1 Nov. 30, 2023

(51) Int. Cl.
| | | |
|---|---|---|
| *G06V 10/62* | (2022.01) | |
| *G06T 7/11* | (2017.01) | |
| *G06T 7/194* | (2017.01) | |
| *G06T 7/246* | (2017.01) | |
| *G06T 7/73* | (2017.01) | |
| *G06V 10/764* | (2022.01) | |
| *G06V 10/80* | (2022.01) | |
| *G06V 20/70* | (2022.01) | |

(52) U.S. Cl.
CPC ............ *G06T 7/248* (2017.01); *G06T 7/11* (2017.01); *G06T 7/194* (2017.01); *G06T 7/74* (2017.01); *G06V 10/62* (2022.01); *G06V 10/764* (2022.01); *G06V 10/806* (2022.01); *G06V 20/70* (2022.01); *G06T 2207/10016* (2013.01); *G06T 2207/20081* (2013.01); *G06T 2207/20221* (2013.01); *G06V 2201/07* (2022.01)

(58) Field of Classification Search
CPC . G06T 7/248; G06T 7/11; G06T 7/194; G06T 7/74; G06T 2207/10016; G06T 2207/20081; G06T 2207/20221; G06T 2207/20084; G06T 2207/30196; G06V 10/62; G06V 10/764; G06V 10/806; G06V 20/70; G06V 2201/07; G06V 10/255; G06V 10/454; G06V 10/82
USPC ........................................................ 382/103
See application file for complete search history.

(56) References Cited

U.S. PATENT DOCUMENTS

| | | | |
|---|---|---|---|
| 11,551,059 B1 * | 1/2023 | Yang | G06N 3/045 |
| 2021/0150728 A1 * | 5/2021 | Ahmed | G06T 7/11 |
| 2022/0207851 A1 * | 6/2022 | Saputra | G06V 20/49 |

* cited by examiner

*Primary Examiner* — Charlotte M Baker
(74) *Attorney, Agent, or Firm* — Polsinelli/Qualcomm

(57) ABSTRACT

Systems and techniques are provided for performing scene segmentation and object tracking. For example, a method for processing one or more frames. The method may include determining first one or more features from a first frame. The first frame includes a target object. The method may include obtaining a first mask associated with the first frame. The first mask includes an indication of the target object. The method may further include generating, based on the first mask and the first one or more features, a representation of a foreground and a background of the first frame. The method may include determining second one or more features from a second frame and determining, based on the representation of the foreground and the background of the first frame and the second one or more features, a location of the target object in the second frame.

30 Claims, 12 Drawing Sheets

SCENE SEGMENTATION AND OBJECT TRACKING

FIELD

This application is related to image processing. In some examples, aspects of this application relate to systems and techniques for scene segmentation and object tracking (e.g., one-shot long-term object tracking).

BACKGROUND

Electronic devices are increasingly equipped with camera hardware to capture frames (also referred to as images) and/or videos for consumption. For example, a computing device can include a camera (e.g., a mobile device such as a mobile telephone or smartphone including one or more cameras) to allow the computing device to capture a video or frame of a scene, a person, an object, etc. The frame or video can be captured and processed by the computing device (e.g., a mobile device, an IP camera, extended reality device, connected device, advanced driver assist system, etc.) and stored or output for consumption (e.g., displayed on the device and/or another device). In some cases, the frame or video can be further processed for effects (e.g., compression, image enhancement, image restoration, scaling, framerate conversion, etc.) and/or certain applications such as computer vision, extended reality (e.g., augmented reality, virtual reality, and the like), object detection, object tracking, image recognition (e.g., face recognition, object recognition, scene recognition, etc.), feature extraction, authentication, and automation, among others.

In some cases, an electronic device can process frames to detect and/or track objects, such as people, faces, animals, vehicles, and/or any other items depicted in the frames. For instance, object detection and tracking can be used to identify an object (e.g., from a digital frame or a video frame of a video clip) and track the object over time. The object detection and/or tracking can be useful for various applications such as, for example, authentication, automation, gesture recognition, surveillance, extended reality, gaming, computer vision, among others. For instance, object detection and tracking can be used by autonomous vehicles to perform autonomous driving operations.

SUMMARY

Systems and techniques are described herein for providing scene segmentation and object tracking (e.g., one-shot long-term object tracking). According to at least one example, a method is provided for processing one or more frames. The method includes: determining first one or more features from a first frame, the first frame including a target object; obtaining a first mask associated with the first frame, the first mask including an indication of the target object; generate, based on the first mask and the first one or more features, a representation of a foreground and a background of the first frame, wherein the foreground of the first frame is associated with the target object; determining second one or more features from a second frame; and determine, based on the representation of the foreground and the background of the first frame and the second one or more features, a location of the target object in the second frame.

In another example, an apparatus for processing one or more frames is provided that includes at least one memory and at least one processor coupled to the at least one memory. The at least one processor is configured to: determine first one or more features from a first frame, the first frame including a target object; obtain a first mask associated with the first frame, the first mask including an indication of the target object; generate, based on the first mask and the first one or more features, a representation of a foreground and a background of the first frame, wherein the foreground of the first frame is associated with the target object; determine second one or more features from a second frame; and determine, based on the representation of the foreground and the background of the first frame and the second one or more features, a location of the target object in the second frame.

In another example, a non-transitory computer-readable medium is provided that has stored thereon instructions that, when executed by one or more processors, cause the one or more processors to: determine first one or more features from a first frame, the first frame including a target object; obtain a first mask associated with the first frame, the first mask including an indication of the target object; generate, based on the first mask and the first one or more features, a representation of a foreground and a background of the first frame, wherein the foreground of the first frame is associated with the target object; determine second one or more features from a second frame; and determine, based on the representation of the foreground and the background of the first frame and the second one or more features, a location of the target object in the second frame.

In another example, an apparatus for processing one or more frames is provided. The apparatus includes: means for determining first one or more features from a first frame, the first frame including a target object; means for obtaining a first mask associated with the first frame, the first mask including an indication of the target object; means for generating, based on the first mask and the first one or more features, a representation of a foreground and a background of the first frame, wherein the foreground of the first frame is associated with the target object; means for determining second one or more features from a second frame; and means for determining, based on the representation of the foreground and the background of the first frame and the second one or more features, a location of the target object in the second frame.

In some aspects, one or more of the apparatuses described herein is, is part of, and/or includes an extended reality (XR) device (e.g., a virtual reality (VR) device, an augmented reality (AR) device, or a mixed reality (MR) device), a mobile device (e.g., a mobile telephone or other mobile device), a wearable device, a head-mounted device (HMD) device, a wireless communication device, a camera, a personal computer, a laptop computer, a server computer, a vehicle or a computing device or component of a vehicle, another device, or a combination thereof. In some aspects, the apparatus includes a camera or multiple cameras for capturing one or more frames. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
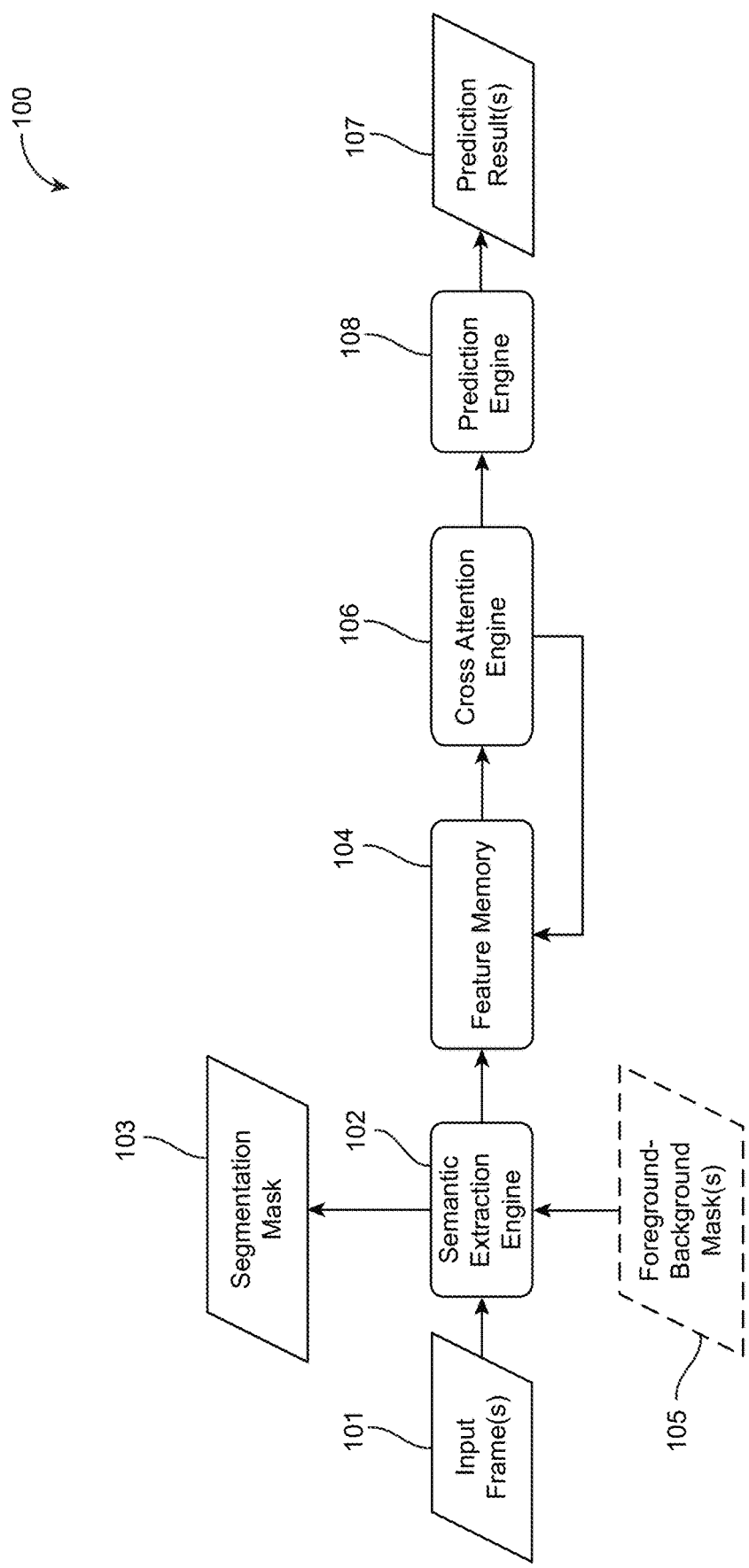
FIG. 1 is a block diagram illustrating an example of a scene segmentation and object tracking system, in accordance with some examples.

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an exemplary aspect. It should be understood that various changes may be made in the function and arrangement of elements without departing from the spirit and scope of the application as set forth in the appended claims.

Electronic devices (e.g., advanced driver assist systems, mobile phones, wearable devices (e.g., smart watches, smart glasses, etc.), computers, extended reality (XR) devices (e.g., virtual reality (VR) devices, augmented reality (AR) devices, mixed reality (MR) devices, and the like), connected devices, servers, analytics systems, camera systems, etc.) can implement cameras to detect, track, and/or recognize events and/or objects of interest. For example, electronic devices can implement cameras that can capture frames or images of a scene. The frames of the scene can be used to detect, track, and/or recognize events and/or objects in the scene. In some examples, an electronic device can obtain a sequence of video frames from a video source, such as a camera, and process the video sequence to perform a variety of tasks such as, for example, object detection, tracking, object recognition, etc.

Object detection can be used to detect or identify an object in an image or frame. Object tracking can be performed to track the detected object over time. For example, a frame of an object can be obtained, and object detection can be performed on the frame to detect one or more objects in the frame. In some cases, an object detector used to detect the object can classify the detected object into a class or category of object. The object detector can generate a bounding region to identify a location of the object in the frame. In some cases, the bounding region can be displayed in the frame in order to identify the object to a user viewing a display. Various types of systems can be used for object detection, including machine-learning based object detectors (e.g., using one or more deep neural networks).

Object detection and tracking can be used in driving systems, video analytics, security systems, robotics systems, aviation systems, extended reality (XR) systems (e.g., augmented reality (AR) systems, virtual reality (VR) systems, mixed reality (MR) systems, etc.), among other systems. In such systems, an object (referred to as a tracking object) tracking other objects (referred to as target objects) in an environment can determine positions and sizes of the other objects. Determining the positions and sizes of target objects in the environment allow the tracking object to accurately navigate the environment by making intelligent motion planning and trajectory planning decisions.

In some cases image segmentation (e.g., semantic segmentation) can be performed to detect multiple segments in a frame. For instance, a system can perform semantic scene segmentation to determine a pixelwise classification (e.g., determining a respective semantic classification for each pixel) for multiple object categories. The system can analyze and process the segments to perform a desired image processing task or generate a desired image effect. For example, a mobile device can include one or more cameras equipped with a portrait mode function that enables shallow depth-of-field ("bokeh") effects. A depth-of-field effect can bring a specific image region or object into focus, such as a foreground object or region, while blurring other regions or pixels in the frame, such as background regions or pixels. The depth-of-field effect can be created using image segmentation techniques to identify and modify different regions or objects in the frame, such as background and foreground regions or objects. In some examples, a depth-of-field effect can be created with the aid of depth information associated with the frame.

Existing solutions for scene segmentation and/or object tracking have certain limitations. For instance, an example of a solution for object tracking includes performing a local search in a region near a location of a target object in a previous frame. However, performing such a local search relies on prediction based on the previous frame, which may be suitable for short-term tracking but cannot be used to re-detect the target object over a large number of frames (e.g., more than 5 frames). Another example of a solution for object tracking includes performing detection and tracking by searching for target objects based on object detection results. One problem with such a solution is that it relies on object detection, which has certain issues. For example, object detection is limited by pre-defined classes that can be detected, where any objects that are not part of the pre-defined classes cannot be detected. Further, object detection is a complex process that requires a high amount of computing resources. Another solution involves using separate segmentation and tracking models (e.g., neural network models), which may also have high computational cost due to the use of two models.

Joint scene segmentation and one-shot long-term object tracking is a desirable solution to allow a system to leverage features of scene segmentation to perform object tracking of one or more of target objects over a plurality of frames. For instance, such a solution can allow real-time video segmentation and tracking. Solutions are needed for efficiently providing scene segmentation and one-shot long-term object tracking.

Systems, apparatuses, processes (also referred to as methods), and computer-readable media (collectively referred to as "systems and techniques") are described herein for performing scene segmentation and object tracking, such as joint scene segmentation and one-shot long-term object tracking. In some aspects, for one-shot long-term object tracking and segmentation, a scene segmentation and object tracking system can perform one-shot learning to learn new objects defined in an initial frame. The scene segmentation and object tracking system can perform long-term tracking to track objects over certain time period (e.g., over a plurality of frames) in various scenarios, such as target and camera motion, target deformation, occlusion, out-of-view, reappearance, etc. Object segmentation can be performed to segment the tracked target objects from the background. The systems and techniques provide an efficient multi-task solution with semantic segmentation and long-term one-shot object tracking and segmentation using semantic scene features (e.g., features extracted from a semantic segmentation neural network or other machine learning model). Such a solution includes an incremental computational cost for multi-object tracking, resulting in a low computational-cost system.

Various aspects of the techniques described herein will be discussed below with respect to the figures. FIG. 1 is a block diagram illustrating an architecture of a scene segmentation and object tracking system 100. The scene segmentation and object tracking system 100 includes various components that are used to track an object in a sequence of video frames, which can include one or more input frames 101. As shown, the components of the scene segmentation and object tracking system 100 include a semantic extraction engine 102, a feature memory 104, a cross attention engine 106, and a prediction engine 108.

The scene segmentation and object tracking system 100 can include or be part of a computing device, such as a mobile device (e.g., smartphone, cellular telephone, or the like), a camera, a vehicle or component or system (e.g., an advanced driver assistance system (ADAS), an autonomous driving system, etc.), an extended reality (XR) device (e.g., a virtual reality (VR) head-mounted display (HMD), augmented reality (AR) glasses or HMD, mixed reality (MR) glasses or HMD, etc.), a desktop computer, a laptop or notebook computer, a tablet computer, a set-top box, a gaming device or console, a television, a display device, a digital media player, a video streaming device, a server computer, or any other suitable computing device. In some examples, the scene segmentation and object tracking system 100 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the scene segmentation and object tracking system 100 (e.g., the semantic extraction engine 102, the feature memory 104, the cross attention engine 106, and the prediction engine 108) can be part of the same computing device. In some implementations, the components of the scene segmentation and object tracking system 100 can be part of two or more separate computing devices. In some cases, the scene segmentation and object tracking system 100 can be implemented as part of the computing system 1300 shown in FIG. 13.

While the scene segmentation and object tracking system 100 is shown to include certain components, one of ordinary skill will appreciate that the scene segmentation and object tracking system 100 can include more components or fewer components than those shown in FIG. 1. In some cases, additional components of the scene segmentation and object tracking system 100 can include software, hardware, or one or more combinations of software and hardware. For example, in some cases, the scene segmentation and object tracking system 100 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 1. In some implementations, additional components of the scene segmentation and object tracking system 100 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the scene segmentation and object tracking system 100.

As noted above, the scene segmentation and object tracking system 100 can process a sequence of frames (e.g., a video, a group of consecutively captured frames or images, or other sequence of frames) of a scene in which at least one target object is located. The sequence of frames can include the one or more input frames 101. The sequence of frames may be obtained by the scene segmentation and object tracking system 100 from a frame source. The frame source can include one or more image capture devices (e.g., a camera, a camera phone, a video camera, a tablet device with a built-in camera, or other suitable image capture device), an image storage device, an image archive containing stored frames, an image server or content provider providing frame data, a media feed interface receiving frames or video from a server or content provider, a computer graphics system for generating computer graphics frame data, a combination of such sources, or other source of frame content. In some examples, the scene segmentation and object tracking system 100 and the frame source can be part of the same computing device (e.g., mobile device, camera device, XR device, vehicle or computing system of a vehicle, etc. In some examples, the scene segmentation and object tracking system 100 and the frame source can be part of separate computing devices.

For instance, in some cases, the sequence of frames can be captured by one or more image capture devices (not shown) of the scene segmentation and object tracking system 100. Each of the one or more image capture devices can include a camera or other type of image sensor, such as a camera configured to capture color images (e.g., red-green-blue (RGB) frames; luma, chroma-blue, chroma-red (YCbCr or Y'CbCr) frames; and/or any other suitable type of frame) and/or monochrome frames, an infrared (IR) camera configured to capture IR frames or images and/or near-infrared (NIR) frames or images, any combination thereof, and/or other type of camera or image sensor. In one illustrative example, the scene segmentation and object tracking system 100 can include an RGB camera or multiple RGB cameras. In some cases, the scene segmentation and object tracking system 100 can include one or more IR cameras and one or more RGB cameras.

The semantic extraction engine 102 can process a frame from the one or more frames 101 to generate one or more segmentation masks 103 for the frame. In some cases, the one or more segmentation masks 103 can include a segmentation mask for each category or class for which the semantic extraction engine 102 is configured to predict. The one or more segmentation masks 103 can include a respective classification for each pixel in the frame. For instance, if the frame includes a person (as the target object), a tree, grass, and sky, certain pixels can be classified by the semantic extraction engine 102 as "person" class, as a "tree" class, as a "grass" class, or as a "sky" class. In generating the one or more segmentation masks 103, the semantic extraction engine 102 can generate a plurality of features. For instance, the semantic extraction engine 102 may include or be part of a neural network (or multiple neural networks) trained to perform semantic segmentation. The neural network(s) can include at least one hidden layer that generates one or more feature vectors (or other feature representation(s)) representing features from each frame of the one or more frames 101. Each hidden layer of the neural network(s) can generate one or more feature vectors from an input provided by a previous hidden layer. The semantic extraction engine 102 can extract or output features from one or more of the hidden layers to a feature memory 104. Further details related to the semantic extraction engine 102 are provided below.

As noted above, the output of the semantic extraction engine 102 are output to the feature memory 104. The feature memory 104 can store features extracted by the semantic extraction engine 102 for each frame of the one or more input frames 101. The features stored in the feature memory 104 can represent the foreground (e.g., representing or associated with the target object(s)) and the background of the frame. In some cases, as each new input frame is processed by the semantic extraction engine 102, the feature memory 104 or a processing device of the system 100 (e.g., a DSP, microprocessors, CPU, etc.) can update the features stored in the feature memory 104 based on features extracted from the new input frame (e.g., by adding the new features, by merging the new features with previously-stored features, by removing old features when a storage limit or capacity of the feature memory 104 is reached or exceeded, etc.). In some examples, the feature memory 104 or processing device may pause updating of the feature memory 104 when a prediction confidence from the prediction engine 108 is less than a confidence threshold (e.g., 0.80 or 80%, 0.85 or 85%, 0.9 or 90%, or other confidence threshold). In some cases, the feature memory 104 or processing device may select features with an uncertainty that is less than an uncertainty threshold (e.g., 0.05 or 5%, 0.1 or 10%, 0.15 or 15%) for updating the feature memory 104. In some aspects, the features extracted from the initial frame are maintained or kept in the feature memory 104 (e.g., the features extracted by the semantic extraction engine 102 from the initial frame are unchanged in the memory). Further details related to the feature memory 104 are provided below.

In some cases, such as for an initial frame of the one or more input frames 101, the scene segmentation and object tracking system 100 may use a foreground-background mask 105 to learn the foreground (e.g., corresponding to the target object) and a background of a particular frame. The foreground-background mask 105 may be a binary mask including pixels of a first value (e.g., an 8-bit pixel value of 255) representing a target object in a corresponding input frame (e.g., an initial frame of the one or more frames 101) and a second value (e.g., an 8-bit pixel value of 0) representing the background in the corresponding input frame. The semantic extraction engine 102 can use the foreground-background mask 105 to guide the learning of the foreground and background of the corresponding input frame (e.g., the initial frame of the one or more frames 101). In some aspects, a foreground-background mask 105 is only used for the initial frame to initialize the features stored in the feature memory 104 for the sequence of frames. In such aspects, the scene segmentation and object tracking system 100 can process subsequent input frames in the sequence of frames (frames after the initial frame in the one or more input frames 101) without using a foreground-background mask as input.

During tracking (e.g., for each frame after the initial frame of the one or more input frames 101), the semantic extraction engine 102 can generate one or more segmentation masks 103 and extract features that can be used by the scene segmentation and object tracking system 100 to track the at least one target object in the sequence of frames. For example, the semantic extraction engine 102 can output features extracted from a current input frame (e.g., a frame after the initial frame) to the cross attention engine 106. As noted above, the features represent the foreground (e.g., representing or associated with the target object(s)) and the background of the frame. The cross attention engine 106 may obtain the stored features from the feature memory 104. The cross attention engine 106 can compare the stored features with the features extracted from the current input frame to generate a combined representation (e.g., a combined feature) that represents the foreground and the background of the current frame. The cross attention engine 106 can output the combined representation or feature to the prediction engine 108. The prediction engine 108 generate a prediction result 107 by determining or predicting a location of the target object in the current input frame based on a representation of the foreground (associated with the target object) and the background of the current input frame in the combined representation or feature. In some cases, the prediction engine 108 may generate a bounding box (or other bounding region) representing the location of the target object. In some examples, the prediction engine 108 may also generate a foreground-background mask (e.g., a binary mask). The foreground-background mask can be used to update the feature memory 104 based on the features extracted from the current frame. Further details related to the cross attention engine 106 and the prediction engine 108 are provided below.

Figure 2:
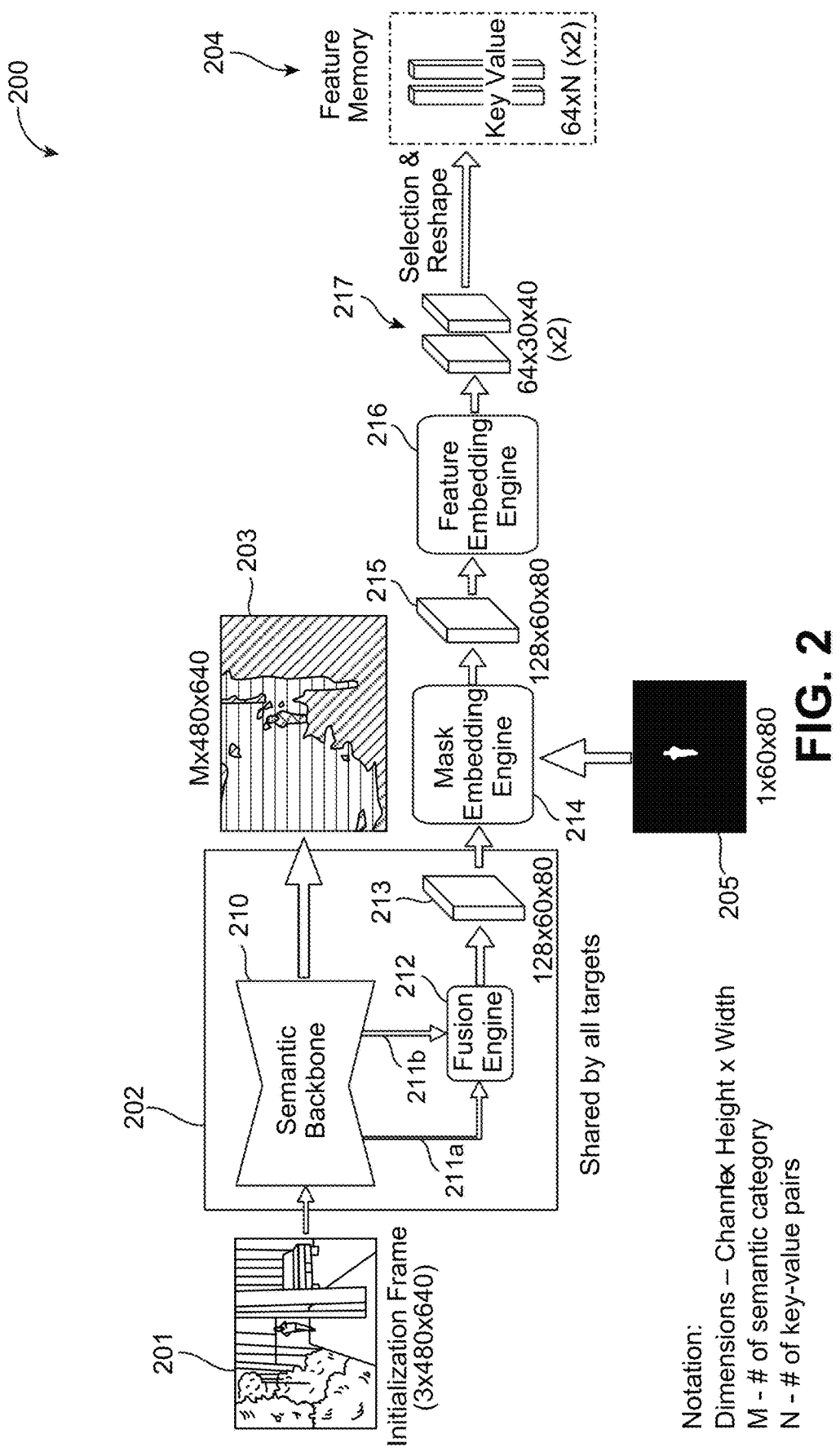
FIG. 2 is a block diagram illustrating an example of a scene segmentation and object tracking system for performing initialization, in accordance with some examples.

FIG. 2 is a block diagram illustrating an example of a scene segmentation and object tracking system 200. In some aspects, the scene segmentation and object tracking system 200 is an example implementation of the scene segmentation and object tracking system 100 for initializing the system for performing object tracking of one or more target objects captured by one or more frames of a scene. For instance, the scene segmentation and object tracking system 200 can use an initialization frame 201 to initialization the scene segmentation and object tracking system for tracking. The initialization frame 201 can include an initial frame (e.g., a first frame) of a sequence of frames (e.g., a video) of the scene. In one illustrative example, the initialization frame 201 may have a resolution of 480 pixels by 640 pixels with 3 color channels (e.g., red (R), green (G), and blue (B) color channels or components), shown in FIG. 2 as 3×480×640. The initialization frame 201 can have any other suitable resolution or number of color channel(s).

Figure 10:
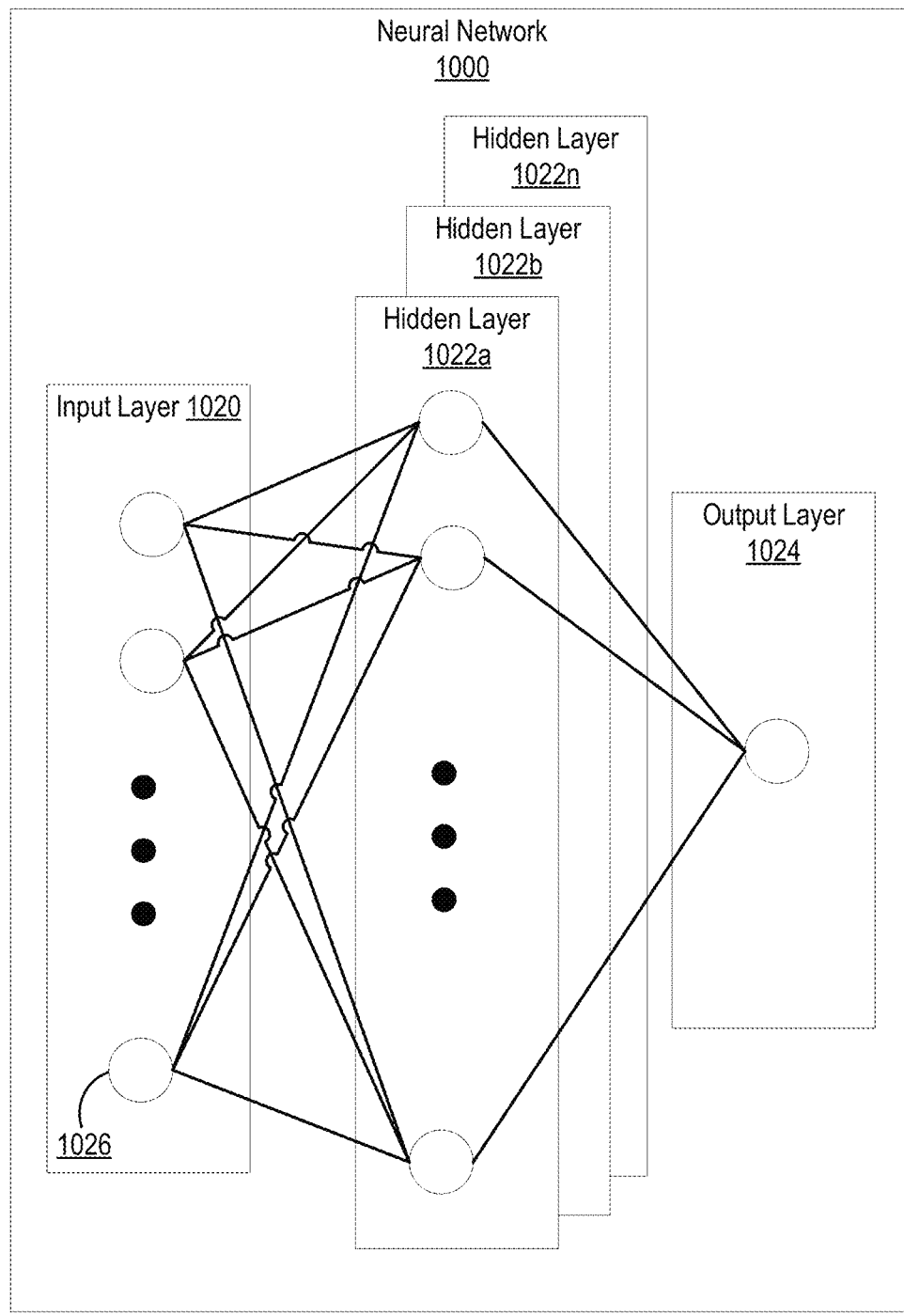
FIG. 10 is a block diagram illustrating an example of a neural network, in accordance with some examples.
Figure 11:
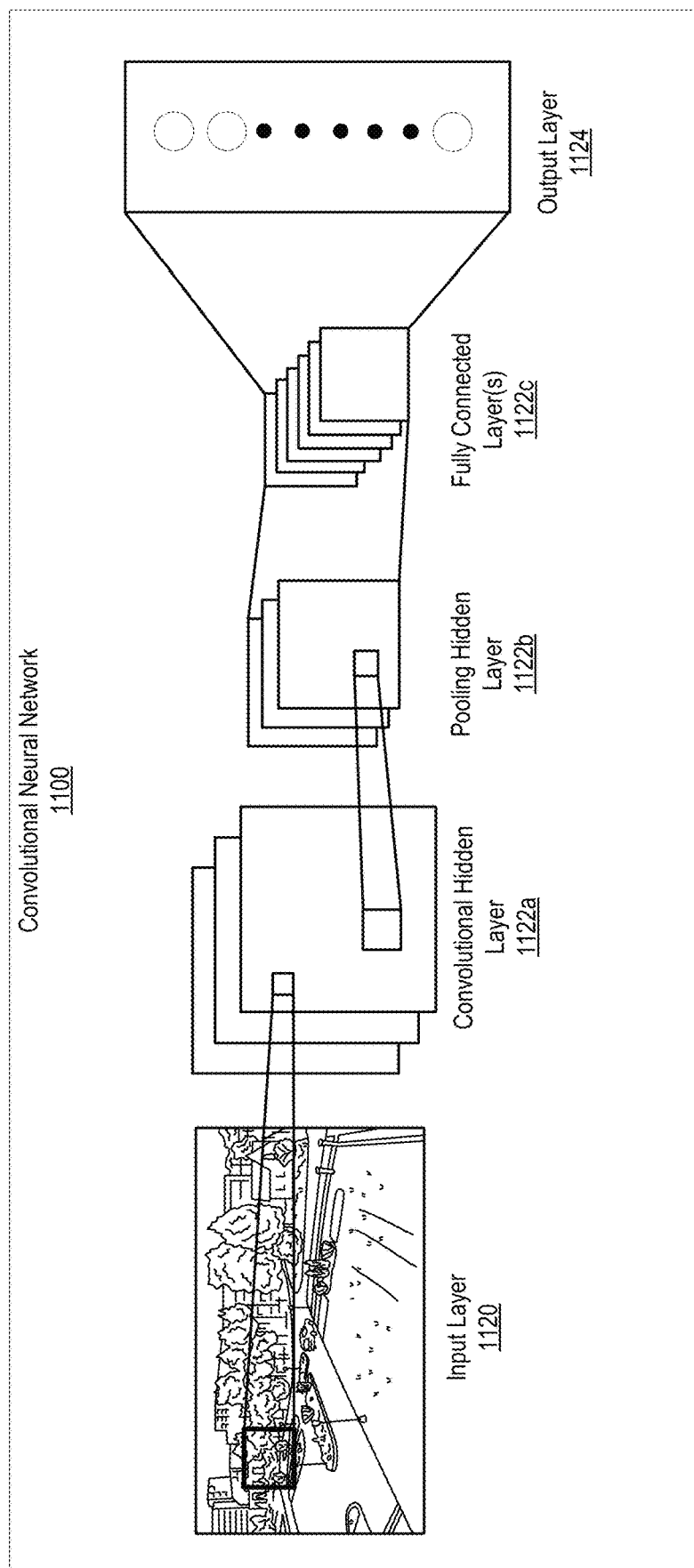
FIG. 11 is a block diagram illustrating an example of a convolutional neural network (CNN), in accordance with some examples.

A semantic extraction engine 202 (as an example of the semantic extraction engine 102 of FIG. 1) includes a semantic backbone 210 for performing semantic segmentation and feature extraction. The semantic backbone 210 can include a machine learning system, such as a neural network, trained to perform semantic segmentation. For instance, the semantic backbone 210 may be implemented as an encoder-decoder neural network that is trained using a plurality of training frames or images based on supervised learning (e.g., based on backpropagation techniques using one or more loss functions, such as mean squared error (MSE), cross-entropy loss, any combination thereof, and/or other loss functions), semi-supervised learning, or unsupervised learning. Illustrative examples of neural networks that may be used for the semantic extraction engine 202 and/or the semantic backbone 210 are shown in FIG. 10 and FIG. 11 and are described in more detail below.

The semantic backbone 210 can process the initialization frame 201 to generate one or more segmentation masks 203. Similar to the one or more segmentation masks 103, the one or more segmentation masks 203 can include a respective classification for each pixel in the initialization frame 201. For instance, as shown in FIG. 2, the initialization frame 201 includes a person (which is a target object to be tracked in the sequence of frames) in the middle of the frame 201 and other background information (e.g., foliage such as trees and bushes, a building, etc.). The body of the person is classified into a first class (e.g., a "person" class), the face of the person is classified into a second class (e.g., a "face" class), the foliage from the frame 201 is classified into a third class (e.g., a "foliage" class), and the building in the frame 201 is classified into a fourth class (e.g., a "building" class), as illustrated by the different patterns in the one or more segmentation masks 203. The one or more segmentation masks 203 can be of any suitable size. For example, each segmentation mask of the one or more segmentation masks 203 may have a same resolution as a corresponding input frame (e.g., the initialization frame 201), with a depth dimension corresponding to the number of semantic categories. In the example illustrated in FIG. 2, the one or more segmentation masks 203 have a resolution of 480×640 (matching the resolution of the initialization frame 201) and a depth of M corresponding to the number of semantic categories, resulting in M×480×640 segmentation masks. In one example, M may be equal to 4 in the example above of a "person" class, a "face" class, a "foliage" class, and a "building" class. In such an example, there may be more than 4 semantic categories, but none of the objects in the initialization frame 201 correspond to the additional semantic categories for which the semantic backbone 210 is trained to classify. The one or more segmentation masks 203 may be used for one or more processes in a system (e.g., a camera system) including the scene segmentation and object tracking system 200 or a system that is separate from the scene segmentation and object tracking system 200. For instance, a camera system may use the segmentation mask to process a frame, such as to process different parts (identified by the segmentation mask) of the image differently.

The semantic backbone 210 generates a plurality of features as part of the process of generating the one or more segmentation masks 203. For instance, in the example of a neural network implementation for the semantic backbone 210, each hidden layer of the neural network can output one or more feature maps with a particular resolution at a particular depth (e.g., one or more channels of feature maps). In the example of an encoder-decoder neural network, each subsequent hidden layer of the encoder portion may output a feature map having a smaller resolution (or scale) as compared to a previous hidden layer, while each subsequent hidden layer of the decoder portion may output a feature map having a larger resolution (or scale) as compared to a previous hidden layer. In some cases, the scene segmentation and object tracking system 200 may be used to track multiple objects. In such a multi-object tracking case, all target objects may share the same extracted features so that the semantic backbone 210 is run only once for the initialization frame 201.

The semantic extraction engine 202 may extract features from the semantic backbone 210 and output the extracted features to a fusion engine 212 of the semantic extraction engine 202. For instance, as noted above, each hidden layer of a neural network making up the semantic backbone 210 may output feature maps having different resolutions or scales. The semantic backbone 210 may extract feature maps from the one or more of the hidden layers and output the feature map(s) to the fusion engine 212. In some cases, the extracted features may be features having different resolutions or scales, such as features 211a have a first resolution or scale and features 211b having a second resolution or scale. In one illustrative example, the feature 211a may be a low-level feature (e.g., related to appearance, such as color, texture, etc.) in an early stage of the network, which may be one quarter (¼) of the input resolution. In such an example, the feature 211b may be a high-level feature in a late stage of the network, which may be one eight (⅛) of the input resolution. In some examples, the high level feature may include more semantic meaning (related to semantic categories) than the feature 211a. The fusion engine 212 can fuse the extracted features (e.g., features having different scales) into a fused feature 213 having a particular resolution, such as one 128-dimensional (128D) feature having ⅛ of the input resolution. In the example shown in FIG. 2, the fused feature 213 has a resolution of 60×80 (which is ⅛ of the resolution of the 480×640 initialization frame 201) and a depth of 128 channels (e.g., corresponding to 128 features maps each having a resolution of 60×80).

The semantic extraction engine 202 may output the fused feature 213 to a mask embedding engine 214. The mask embedding engine 214 can use the fused feature 213 and a foreground-background mask 205 to learn the foreground (e.g., corresponding to the target object) and a background of the initialization frame 201. In some aspects, the mask embedding engine 214 can use the foreground-background mask 105 to guide the learning of the features of the fused feature 213 that correspond to the foreground (corresponding to the target object) and the features of the fused feature 213 that correspond to the background of the initialization frame 201, which can provide a one-shot learning of the foreground and background of the scene depicted in the initialization frame 201. For instance, the mask embedding engine 214 can combine the fused feature 213 generated for the initialization frame 201 with the foreground-background mask 205 to generate a modified feature 215. In one illustrative example, to combine the fused feature 213 with the foreground-background mask 205, the mask embedding engine 214 may embed the foreground-background mask 205 into a feature (denoted by x) of a particular size (e.g., a size of 128×60×80) with a convolutional layer and may add the feature x to the fused feature 213. The sum from adding the feature x to the fused feature 213 can be output to another convolutional layer to generate the modified feature 215. The modified feature 215 may have a same dimension and depth as that of the fused feature 213 (e.g., a resolution of 60×80 and a depth of 128) as shown in FIG. 2, or may have a different resolution and/or depth.

Similar to the foreground-background mask 105 of FIG. 1, the foreground-background mask 205 may be a binary mask that includes pixels of a first value (e.g., an 8-bit pixel value of 255 shown as a white color in FIG. 2) representing the target object in the initialization frame 201 and a second value (e.g., an 8-bit pixel value of 0 shown as a black color in FIG. 2) representing the background in the initialization frame 201. In some cases, the target object can be identified by a user, such as based on user input provided by the user via a user interface of the device in which the scene segmentation and object tracking system 200 is implemented or by a separate device in communication with the system 200. For instance, the user interface may display the initialization frame 201 on a touch interface of the device. The user may touch a portion of initialization frame 201 that corresponds to the person in the initialization frame 201 to indicate to the scene segmentation and object tracking system 200 that the person is a target object that is to be tracked. The scene segmentation and object tracking system 200 (or other system) can generate the foreground-background mask 105 based on the user input.

As noted above, in some aspects, a foreground-background mask may only be used for the initialization frame 201 to initialize the features stored in a feature memory 204 for the sequence of frames. In such aspects, the scene segmentation and object tracking system 200 can process subsequent input frames in the sequence of frames (frames after the initial frame in the one or more input frames 101) without using a foreground-background mask as input for performing tracking. In some cases, as described in more detail herein, a foreground-background mask can be generated for each frame (e.g., after tracking is performed) in order to update the feature memory 204.

The modified feature 215 may be output to a feature embedding engine 216, which can further embed the modified feature 215 as key-value pairs 217 to initialize the feature memory 204. For instance, as shown in FIG. 2, the key-value pairs 217 may include two feature maps, with each feature map having a dimension of 30×40 and a depth of 64 channels. The key-value pairs 217 may be reshaped to a dimension of 64×N (×2) (corresponding to keys of dimension 64×N and values of dimension 64×N), with 64 being a number of channels (e.g., in a depth dimension), N corresponding to the number of key-value pairs stored in the feature memory 204, and ×2 indicating that there are two 64×N tensors or vectors. In such an example, there are N keys and N values, each of which is a 64-dimensional tensor or vector (thus the shape of the keys and values are 64×N). The initially stored key-value pairs of the features stored in the feature memory 104 can represent the foreground (e.g., representing or associated with the target object(s)) and the background of the initialization frame 201. As described in more detail herein, as each subsequent frame of the sequence of frames is processed by the semantic extraction engine 202, the features stored in the feature memory 104 can be updated based on newly extracted features (e.g., by adding the new features, by merging the new features with previously-stored features, by removing old features when a storage limit or capacity of the feature memory 104 is reached or exceeded, etc.).

Figure 3:
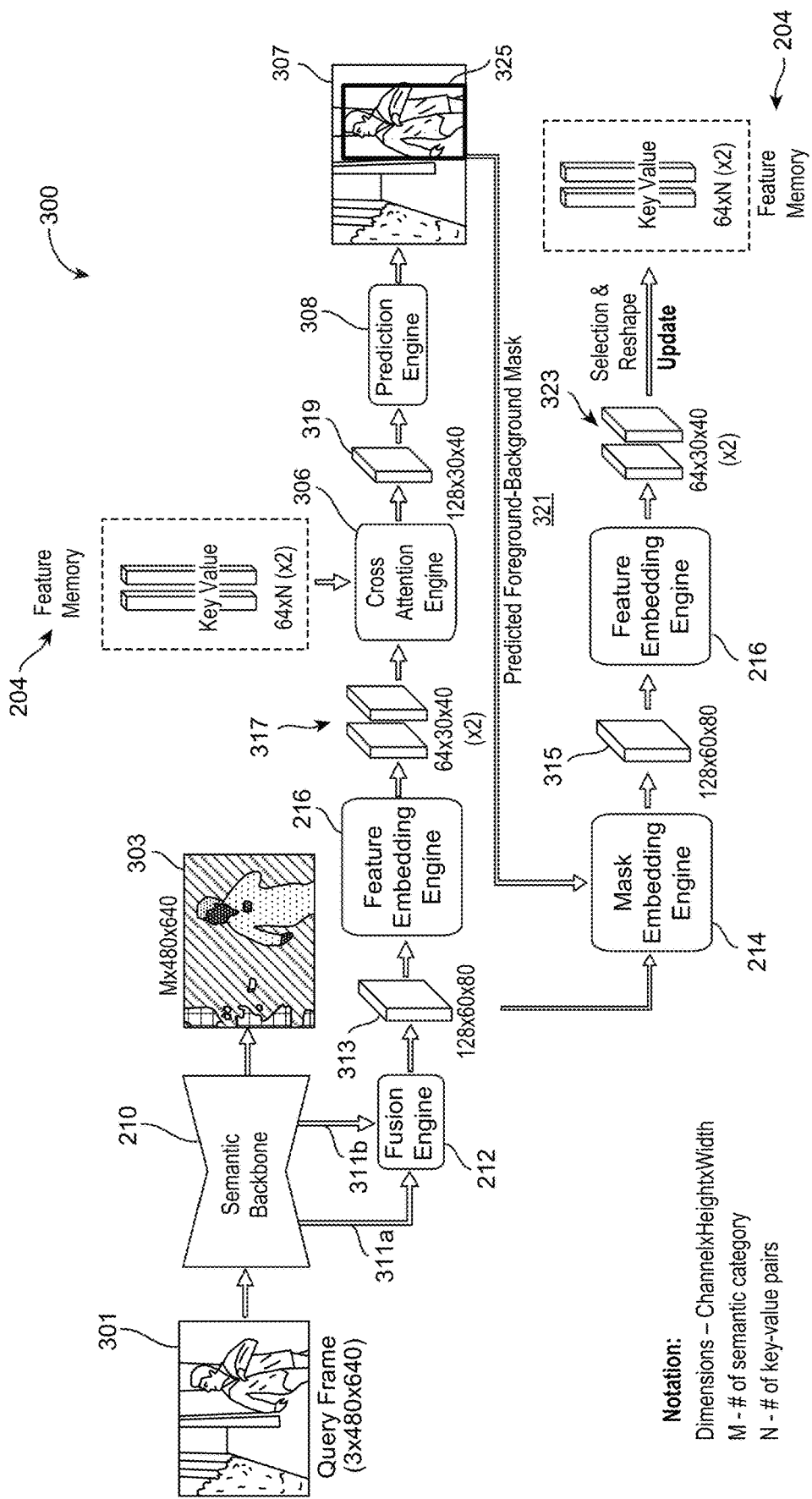
FIG. 3 is a block diagram illustrating an example of a scene segmentation and object tracking system for performing prediction for object tracking, in accordance with some examples.

FIG. 3 is a block diagram illustrating an example of a scene segmentation and object tracking system 300 for performing prediction for object tracking of the one or more target objects in one or more frames (referred to as query or search frames) following the initialization frame 201 of the sequence of frames described above with respect to FIG. 2. The scene segmentation and object tracking system 300 may perform the prediction for object tracking based on a global search performed via cross attention (e.g., via the cross attention engine 306). In some aspects, the scene segmentation and object tracking system 300 is an example implementation of the scene segmentation and object tracking system 100 when performing tracking of the one or more target objects in the one or more query frames of the sequence of frames. Engines illustrated in FIG. 2 and FIG. 3 with the same name correspond to the same engine. For example, the semantic backbone 210, the fusion engine 212, the mask embedding engine 214, the feature embedding engine 216, and the feature memory 204 of FIG. 3 may be the same as the corresponding components of FIG. 2.

During tracking of the one or more target objects, the semantic backbone 210 can process a current query frame 301 and generate one or more segmentation masks 303 (e.g., M 480×640 segmentation masks) using the techniques described above with respect to FIG. 2. The fusion engine 212 can generate a fused feature 313 based on features (e.g., feature 311a and feature 311b) extracted from the semantic backbone 210. The fused feature 313 can be output to the feature embedding engine 216, which can generate key-value pairs 317 including two feature maps. While the fused feature 213 and the key-value pairs 317 are shown as having a respective resolution and depth dimension, the features can have any suitable resolution and/or depth.

A cross attention engine 306 of the scene segmentation and object tracking system 300 may process key-value pairs from the feature memory 204 and the key-value pairs 317 output the feature embedding engine 216 for the current query frame 301. For instance, the cross attention engine 306 can compare the stored key-value pairs from the feature memory 204 with the key-value pairs 317 extracted from the current query frame to generate a combined representation (e.g., a combined feature 319) that represents the foreground and the background of the current query frame 301.

Figure 4:
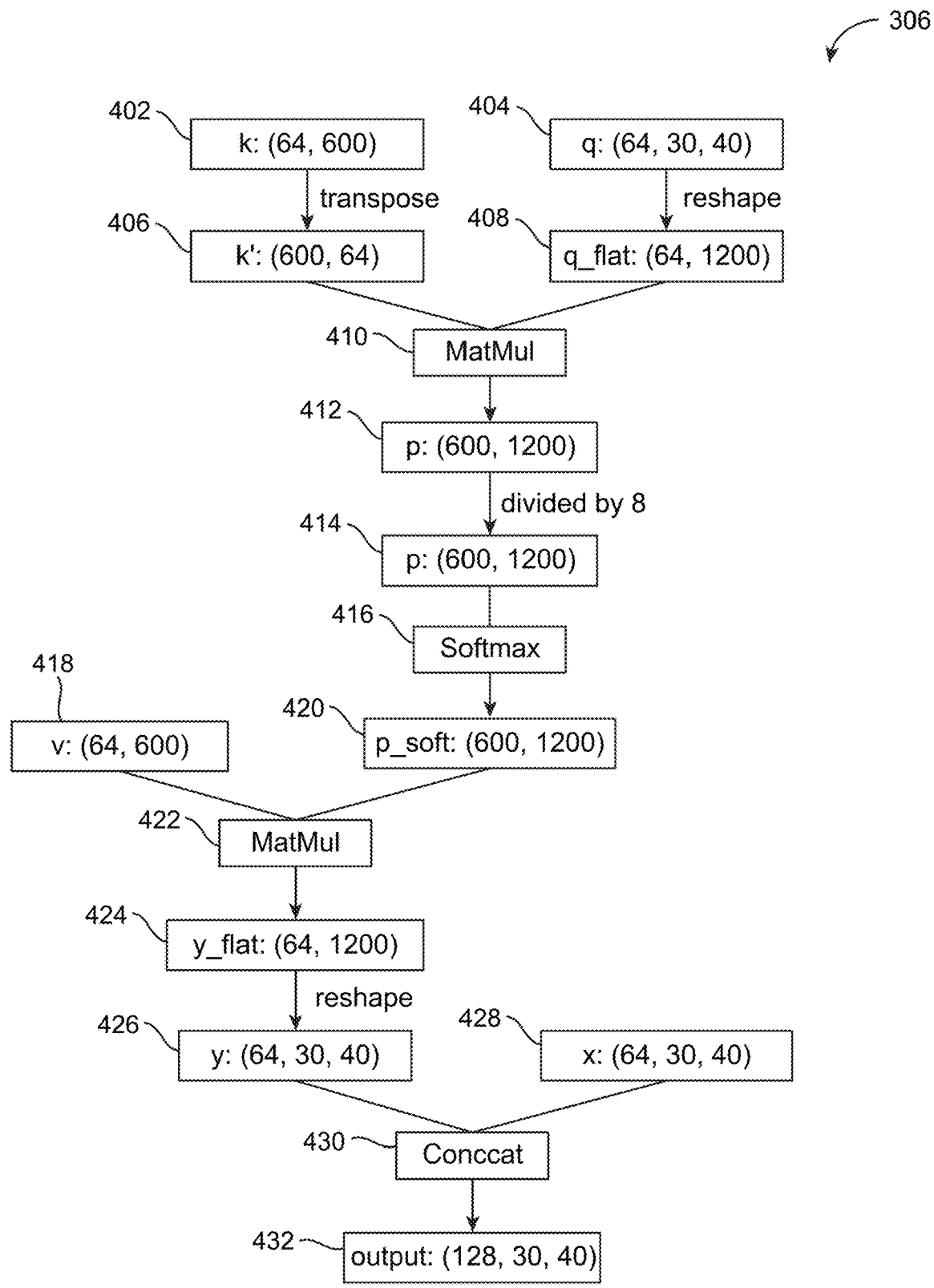
FIG. 4 is a block diagram illustrating an example of a cross attention engine of a scene segmentation and object tracking system, in accordance with some examples.

FIG. 4 is a block diagram illustrating an example implementation of the cross attention engine 306 of FIG. 3. The example implementation of the cross attention engine 306 shown in FIG. 4 may include a neural network made of various layers. An input to the cross attention engine 306 may include keys 402 represented as k (which may correspond to the keys from the key-value pairs stored in the feature memory 204) and keys 404 represented as q (which may correspond to keys from the key-value pairs 317 extracted from the current query frame 301). In one illustrative example implementation of the cross attention engine 306 of FIG. 4 using an input query frame having a resolution of 480×640, the (C, H, W) values can be equal to (64, 30, 40). In such an example N=30*40*0.5=600 is defined as the number of key-value pairs in the feature memory 204. According to such an example, the keys 402 have a dimension of 64×600, with 600 being an example of the N number of key-value pairs stored in the feature memory 204. The keys 404 have a dimension of 64×30×40, similar to the key-value pairs 317 shown in FIG. 3.

A neural network layer of the cross attention engine 306 can perform a transpose operation to change the format of the keys 402 from Shape (C, N) to Shape (N, C). For example, as shown in FIG. 4, the neural network layer may transpose the keys 402 from a dimension of (64, 600) to a dimension of (600, 64) represented as k' (shown as feature 406 in FIG. 4). A neural network layer of the cross attention engine 306 can perform a flatten operation to change the shape of the keys 404 from Shape (C, H, W) to Shape (C, HW). For example, as shown in FIG. 4, the cross attention engine 306 may flatten the keys 404 from the dimension of 64×30×40 to a dimension of 64×1200 represented as q_flat (shown as feature 408 in FIG. 4) having 64 1-dimensional channels, with each channel having 1200 values.

A neural network layer 410 may perform a matrix multiplication operation on the k' and q_flat values to generate a resulting feature denoted as p. For instance, the feature p can be determined by the neural network layer 410 as follows:

$$P_{N,HW} = K_{N,C} * Q_{C,HW}$$ Equation (1)

where N is the number of key-value pairs, C is the number of channels, H is the height of the features 317, and W is the width of the features 317. In the example of FIG. 4, N=600, C=64, H=30, W=40. Using equation (1), the neural network layer 410 may generate a feature p (shown as feature 412) having a dimension of 600×1200. The cross attention engine 306 may then divide the feature p by a value (e.g., by 8) to generate an updated feature p (shown as feature 414). A neural network layer 416 may then perform a softmax operation to generate a p_soft feature 420. For example, the neural network layer 416 may perform the SoftMax operation along each column j of the feature 414 using the following operation:

$$p_{ij} = \frac{\exp(p_{ij})}{\sum_k \exp(p_{kj})}$$ Equation (2)

where $p_{ij}$ are the i-th row, j-th column entry of the p_soft matrix (size 600×1200). In the event softmax is performed along each column j, each column is normalized (sum equals 1). A neural network layer 422 may perform a matrix multiplication operation on values 418 represented as v (which may correspond to the values from the key-value pairs stored in the feature memory 204) and the p_soft feature 420 to generate a resulting feature represented as ay_flat feature 424 having a dimension of 64×1200. For instance, the neural network layer 422 may perform the multiplication as follows:

$$Y_{C,HW} = V_{C,N} * P_{N,HW}$$ Equation (3)

where $V_{C,N}$ correspond to the v values and $P_{N,HW}$ correspond to the values of p_soft feature 420.

The cross attention engine 306 may reshape the y_flat feature 424 from a Shape (C, HW) to a Shape (C, H, W). For example, as shown in FIG. 4, the cross attention engine 306 may reshape the y_flat feature 424 from the dimension of 64×1200 to a dimension of 64×30×40 represented as y (shown as feature 426 in FIG. 4). A neural network layer 430 of the cross attention engine 306 may then concatenate the y feature 426 with values 428 represented as x (which may correspond to the values from the key-value pairs 317 extracted from the current query frame 301) to generate an output feature 432 having a dimension of 128×30×40. The output feature 432 is an example of the combined feature 319 of FIG. 3.

Returning to FIG. 3, the combined feature 319 is input to a prediction engine 308. Based on the representation of the foreground and the background of the current query frame 301 provided by the combined feature 319, the prediction engine 308 can determine the location of the target object in the current query frame 301 (shown as a prediction output 307 in FIG. 3). For instance, the prediction engine 308 may generate a bounding box 325 (or other bounding region) of a target object in the query frame 301, so that a location of the target object can be identified in the current query frame 301 for tracking purposes.

In some examples, the prediction engine 308 may also generate or predict a foreground-background mask 321 (e.g., a binary mask). The foreground-background mask 321 can be used to generate new key-value pairs (representing the features extracted from the current query frame 301) for updating the feature memory 204. For example, as shown in FIG. 3, the foreground-background mask 321 is input to the mask embedding engine 214. The mask embedding engine 214 can use the foreground-background mask 321 to guide the learning of the features of the fused feature 313 that correspond to the foreground (corresponding to the target object) of the current query frame 301 and the features of the fused feature 213 that correspond to the background of the current query frame 301. In one example, the mask embedding engine 214 can combine the fused feature 313 generated for the current query frame 301 with the foreground-background mask 321 to generate a modified feature 315. The feature embedding engine 216 may then embed the modified feature 315 to generate key-value pairs 323. The key-value pairs 323 may be reshaped to a keys of dimension 64×N and values of dimension 64×N. The reshaped key-value pairs 323 may be stored in the feature memory 204. In some cases, the predicted bounding box 325 provided by the prediction engine 308 for the current query frame 301 may be used to filter out false positives in the foreground-background mask 321. For example, any pixels in the foreground-background mask 321 that correspond to the target object and that are outside of the bounding box 325 may be changed to a pixel value corresponding to the background.

As described above with respect to FIG. 1, the key-value pairs stored in the feature memory 204 may be updated with the new key-value pairs 323 (after reshaping) representing features of the current query frame 301. For instance, as each query frame is processed by the scene segmentation and object tracking system 300, the feature memory 204 or a processing device of the system 200 (e.g., a DSP, microprocessors, CPU, etc.) can update the feature memory 204 based on the key-value pairs determined for the current query frame 301. Examples of updating the feature memory 204 are described below with respect to FIG. 5.

Figure 5:
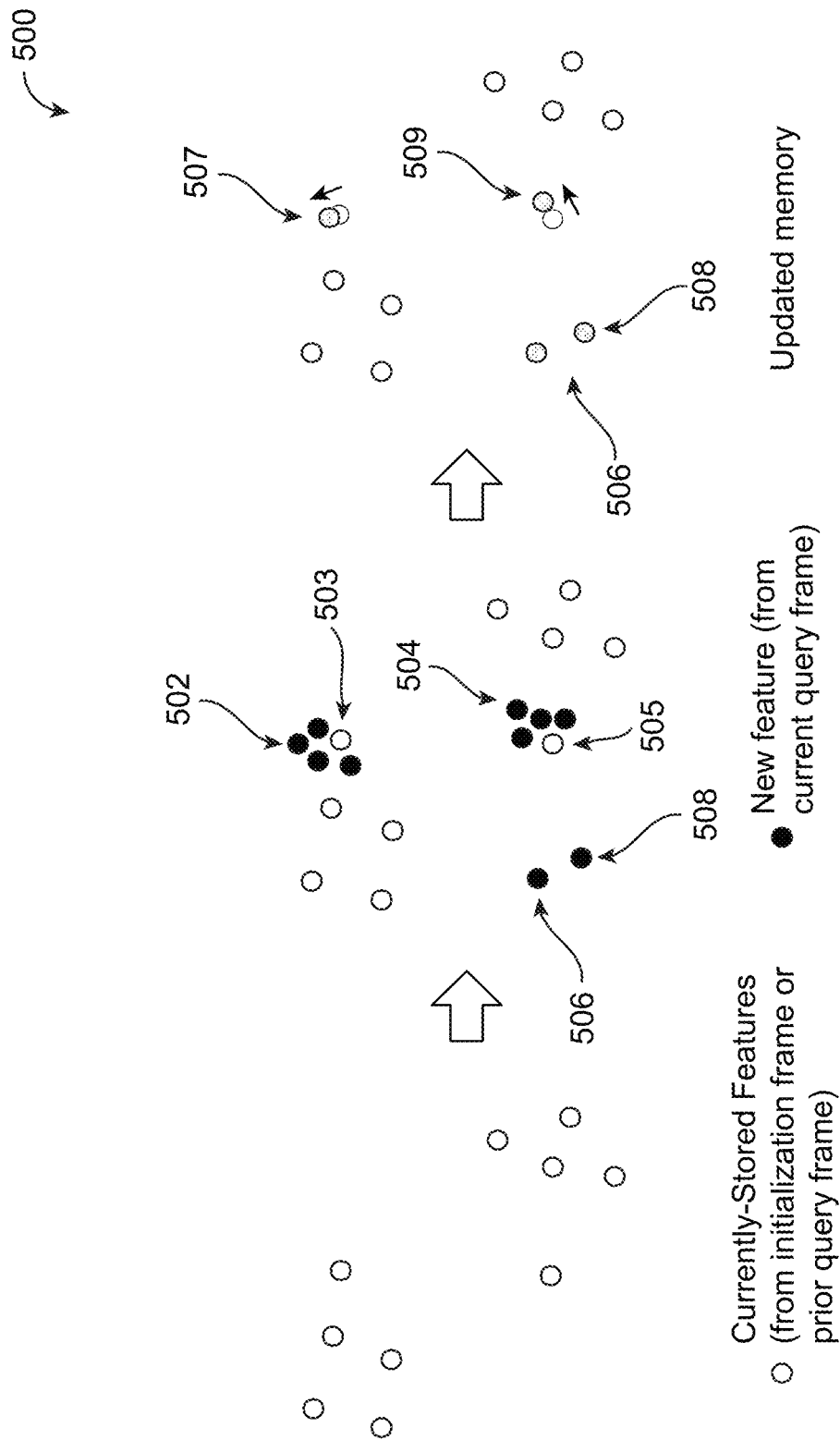
FIG. 5 is a conceptual diagram illustrating an example of maintaining and/or updating a feature memory with features from a scene segmentation and object tracking system, in accordance with some examples.

FIG. 5 is a conceptual diagram 500 illustrating an example of maintaining and/or updating the feature memory 204 with the foreground/background feature (or key-values representing the features) learned by the scene segmentation and object tracking system 300 for a current query frame (e.g., current query frame 301). As noted above, foreground and background features extracted from the semantic backbone 210 are embedded (by the feature embedding engine 216) as key-value pairs and saved in the feature memory 204. The feature memory 204 may have limited space defined by a storage limit or capacity. The feature memory 204 is updated as new features (key-value pairs) are learned by the scene segmentation and object tracking system 300. For example, as shown in FIG. 5, a first cluster 502 of new key-value pairs, a second cluster 504 of new key-value pairs, a new key-value pair 506, and a new key-value pair 508 are determined or learned from the current query frame.

The update of the feature memory 204 can include adding the new key-value pairs, merging the new key-value pairs with previously-stored key-value pairs, removing old key-value pairs (e.g., removing oldest key-value pairs first in a first-in-first-out manner) when the storage limit or capacity of the feature memory 204 is reached or exceeded, any combination thereof, or other operation. In some aspects, the features extracted from the initial frame are maintained or kept in the feature memory 204 (e.g., the features extracted by the semantic backbone 210 from the initial frame are unchanged in the feature memory 204). In such aspects, the features (or key-value pairs) removed from the feature memory 204 may be those extracted based on query frames.

As shown in FIG. 5, the key-value pairs in the cluster 502 are merged with a key-value pair 503 that was previously stored in the feature memory 204 to generate a merged key-value pair 507. In one example, the key-value pairs in the cluster 502 can be merged with the key-value pair 503 by averaging the values of the key-value pairs of the cluster 502 with the values of the key-value pair 503. Similarly, the key-value pairs in the cluster 504 are merged (e.g., by averaging) with a key-value pair 505 that was previously stored in the feature memory 204 to generate a merged key-value pair 509. In some cases, the key-value pairs are merged with one another based on the respective key-value pairs being close in value (e.g., less than a threshold difference between the key-value pairs, such as less than 0.3, 0.4, or other value). In one illustrative example, the scene segmentation and object tracking system 300 may process two key-value pairs, referred to as (k1, v1) and (k2, v2). If k1 and k2 are less than the threshold difference, then the two pairs will be merged. As further shown in FIG. 5, the key-value pair 506 and the key-value pair 508 are directly added to the feature memory 204.

In some aspects, the feature memory 204 or processing device may pause updating of the feature memory 204 for a particular query frame when a prediction confidence output by the prediction engine 308 for the query frame is less than a confidence threshold (e.g., 0.80 or 80%, 0.85 or 85%, 0.9 or 90%, or other confidence threshold). For example, a prediction confidence may be output with each prediction output by the prediction engine 308. In some cases, the feature memory 204 or processing device may select features with an uncertainty that is less than an uncertainty threshold (e.g., 0.05 or 5%, 0.1 or 10%, 0.15 or 15%) for updating the feature memory 204. For instance, an uncertainty amount may be output with each prediction output by the prediction engine 308.

As described above, an input to the scene segmentation and object tracking system 200 includes a foreground-background mask 205 with pixels of a certain value (e.g., a value of 255 corresponding to a white color) depicting an outline of the target object. In some examples, the foreground-background mask 205 may designate a target object in the foreground of an frame as a bounding box (e.g., based on face detection, saliency detection, etc.) instead of an outline of the actual target object (as in FIG. 2). In some cases, cyclic self-attention can be performed to refine a foreground-background mask that represents a target object of an initialization frame as a bounding box.

Figure 6:
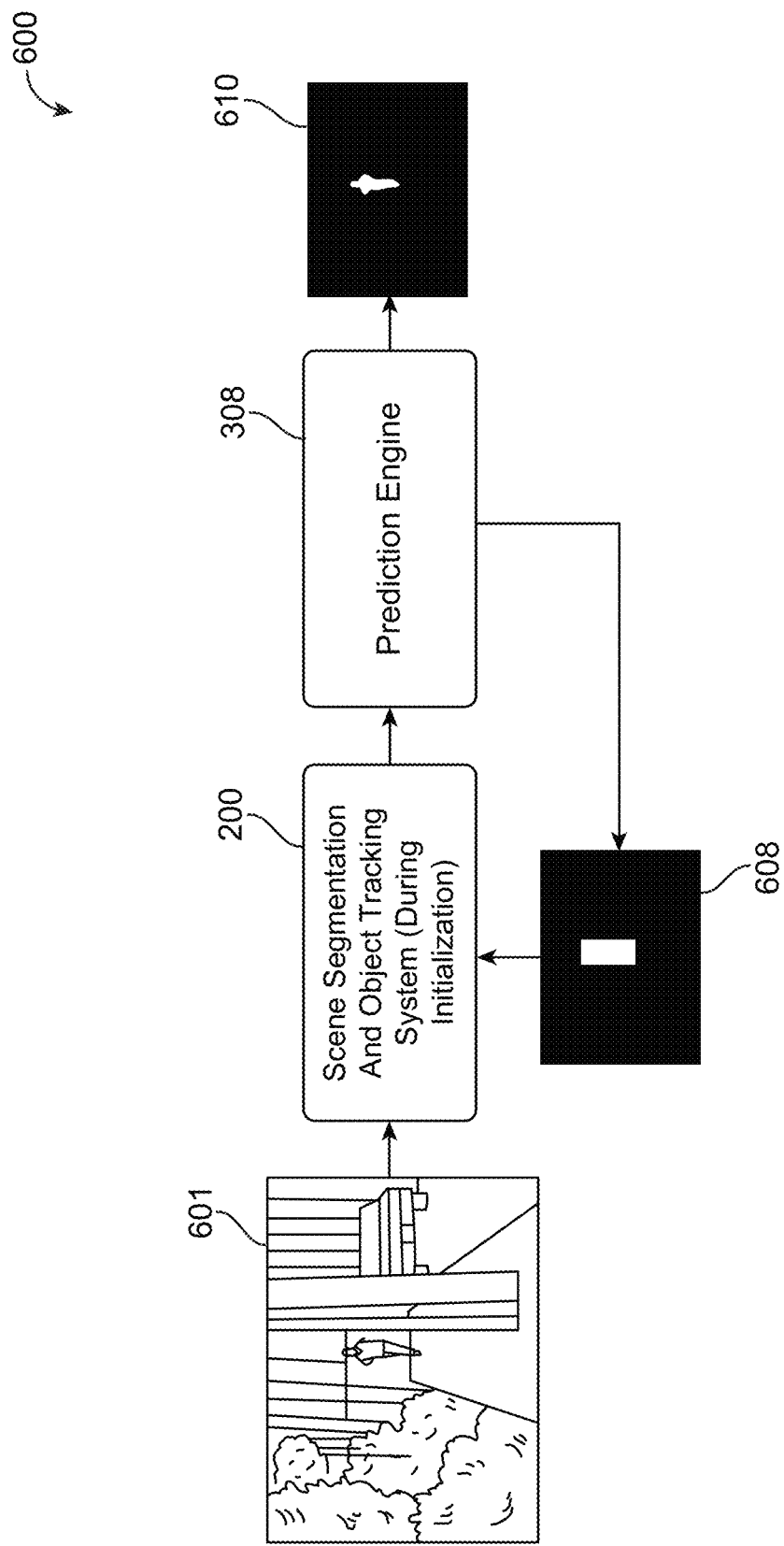
FIG. 6 is a block diagram illustrating an example of cyclic self-attention for tracking initialization, in accordance with some examples.

FIG. 6 is a block diagram illustrating a system 600 that can perform cyclic self-attention for tracking initialization. The cyclic self-attention can be used to refine a foreground-background mask 608 that represents a target object of an initialization frame 601 (shown as a person, similar to that of the initialization frame 201 in FIG. 2) as a bounding box. For instance, the system 600 can perform self-attention on the features extracted from the semantic backbone 210 for an initialization frame (e.g., the initialization frame 301) in a cyclical manner. As shown in FIG. 6, the scene segmentation and object tracking system 200 can perform the tracking initialization described above with respect to FIG. 2 for an initialization frame (e.g., initialization frame 301) to generate key-value pairs 217. The key-value pairs 217 generated for the initialization frame can be input to the prediction engine 308. As described above, the prediction engine 308 can generate a bounding box and a foreground-background mask for the initialization frame. At each iteration of the initialization by the scene segmentation and object tracking system 200 and the prediction by the prediction engine 308, the foreground-background mask will become more refined. After a number of iterations (e.g., three iterations, five iterations, or other number), the prediction engine 308 will generate a refined foreground-background mask 610.

Figure 7:
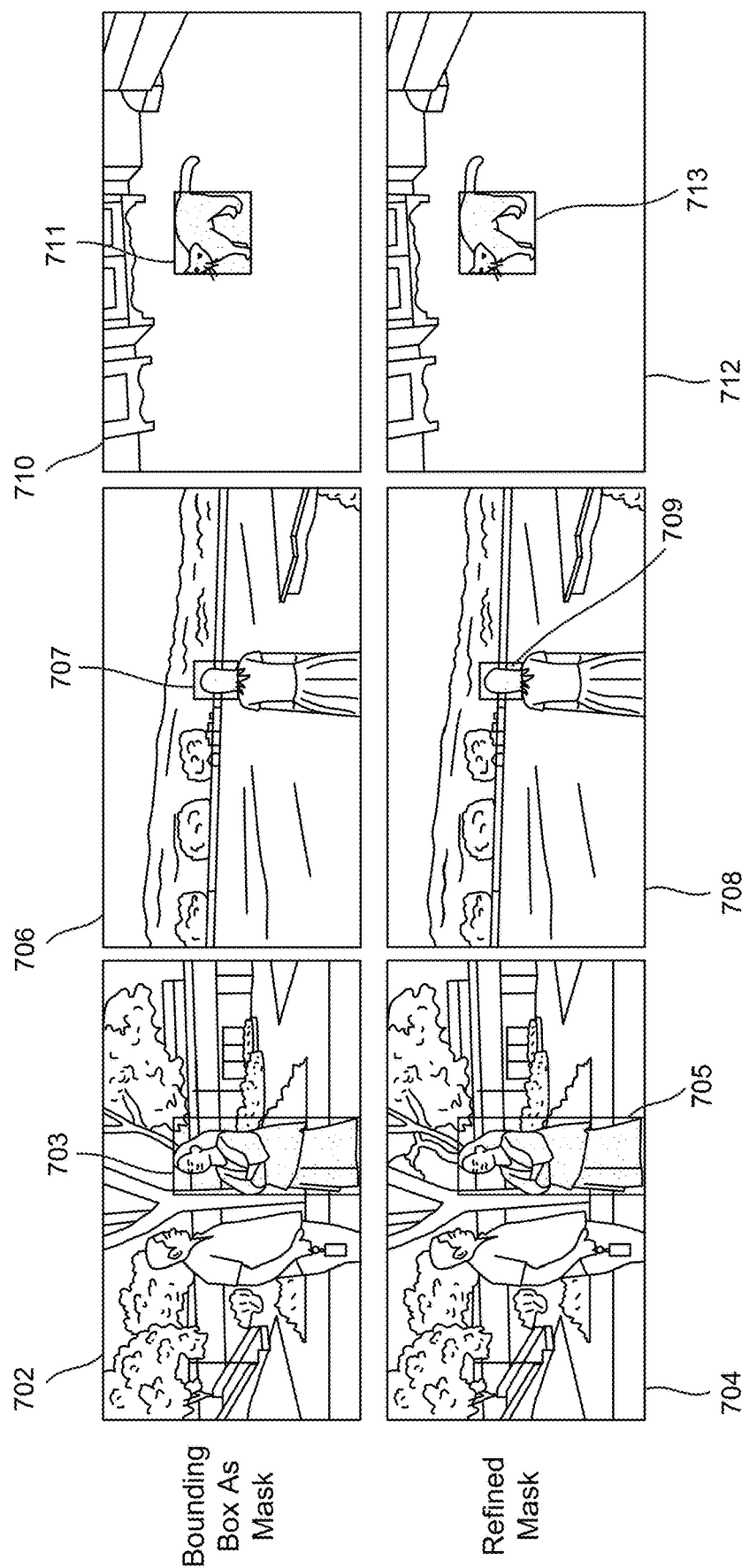
FIG. 7 are images illustrating examples of results of performing cyclic self-attention for tracking initialization, in accordance with some examples.

FIG. 7 are images illustrating examples of results of performing the cyclic self-attention for the tracking initialization. As shown in image 702, a bounding box 703 is used as a foreground-background mask (as indicated by the full shading in the bounding box 703). An image 704 includes a refined foreground-background mask based on the self-attention (as indicated by the shading of only the person in the bounding box 705). Images 706 and 710 illustrate other examples of using bounding boxes (bounding box 707 and bounding box 711) as respective foreground-background masks (as indicated by the full shading in the bounding boxes 707, 709). The image 708 and the image 712 include refined foreground-background masks based on the self-attention described above with respect to FIG. 6 (as indicated by the shading of only the head of the person in the bounding box 709 and the shading of only the cat in the bounding box 713).

Figure 8:
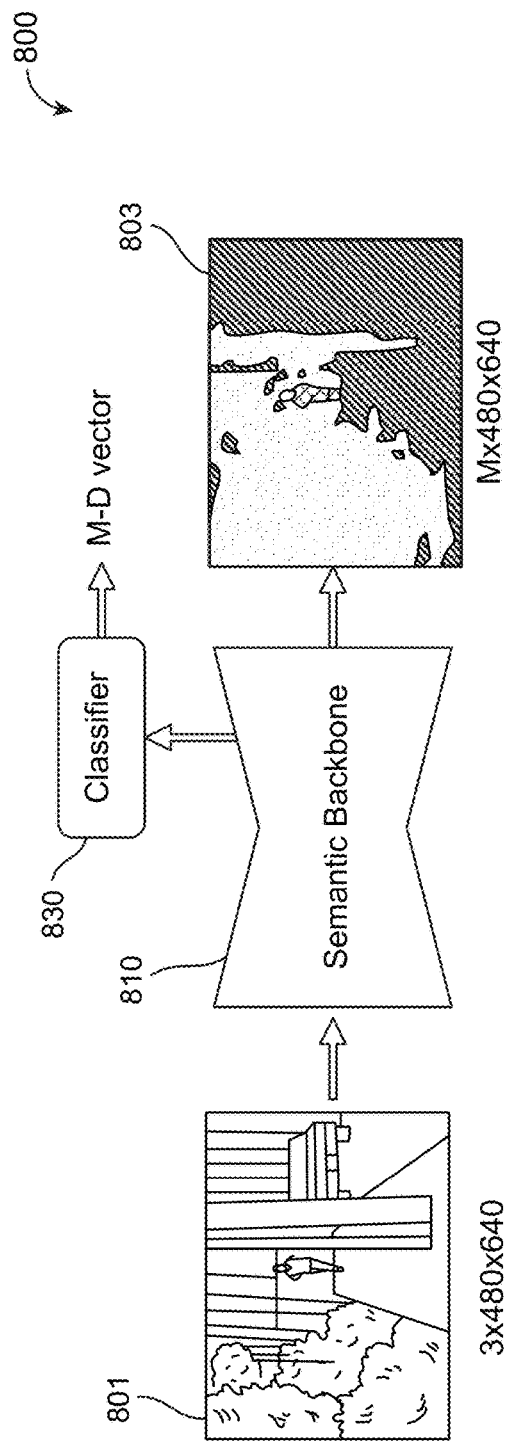
FIG. 8 is a block diagram illustrating an example of a classifier and a semantic backbone of a scene segmentation and object tracking system, in accordance with some examples.

FIG. 8 is a block diagram 800 illustrating an example of a classifier and a semantic backbone of a scene segmentation and object tracking system. As shown, a content classifier 830 branch is added to the semantic backbone 810 (similar to the semantic backbone 210 of FIG. 2 and FIG. 3). In some cases, the content classifier 830 can include a machine learning based classifier (e.g., using one or more neural networks, such as the convolutional neural network 1100 of FIG. 11). The content classifier 830 can predict whether each semantic class for which the semantic backbone 810 is configured to predict is present in an input frame 801. The input frame 801 can include an initialization frame (e.g., the initialization frame 201 of FIG. 2) or a query frame (e.g., the current query frame 301 of FIG. 3). The output of the content classifier 830 may include an M-dimensional vector, where M represents the number of semantic categories or classes for which the semantic backbone 810 is configured to predict.

The content classifier 830 provides global prediction of the content in the frame 801 separately from the pixel-level segmentation performed by the semantic backbone 810. In some cases, an application of content classifier 830 is to reduce false positives of segmentation. For instance, a segmentation mask corresponding to a particular class (e.g., from the M×480×640 segmentation masks of FIG. 2 or FIG. 3) may be removed if the classifier predicts the class is not present (or does not predict that the class is present). Using the content classifier 830 can reduce a frame-level false positive rate (e.g., a ratio of a number of frames with false positives over a number of all test frames). For example, the semantic backbone 810 can output a segmentation mask 803 without any false positive semantic categories or classes.

Figure 9:
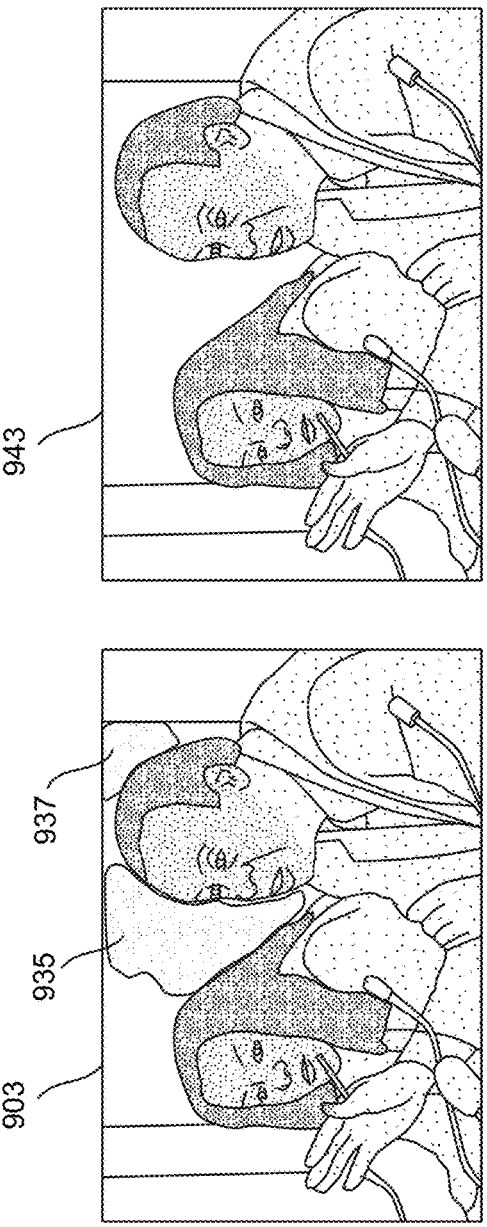
FIG. 9 are images illustrating examples of results of performing classification with scene segmentation and object tracking, in accordance with some examples.

FIG. 9 are images illustrating examples of results of performing classification using the content classifier 830 of FIG. 8. For instance, an image 903 includes two target objects classified as a "people" category or class, and a background object 935 and a background object 937 classified incorrectly as a "sky" category or class. Based on processing the same image through the content classifier 830, the background objects 935, 937 are filtered or removed from the output of the semantic backbone 810, as shown in the image 943 of FIG. 9.

The scene segmentation and object tracking systems and techniques described herein can provide a computationally-efficient joint scene segmentation and object tracking (e.g., one-shot long-term object tracking) by leveraging features determined during semantic scene segmentation to perform object tracking of one or more of target objects over a sequence of frames. For instance, because features used for multi-object tracking are shared with all target objects being tracked, the latency increase is minimal as more target objects are tracked. Furthermore, the semantic segmentation model may be an integrated module of the tracker, in which case turning on the tracking function results in a reduced increase in latency.

Various applications can benefit from such a solution. For example, the scene segmentation and object tracking systems and techniques can enable real-time video segmentation and tracking in an efficient manner. In another example, the scene segmentation and object tracking systems and techniques can provide auto zoom functionality, such as to control a camera to zoom in and/or zoom out and to switch between lenses to keep a tracked object at a constant size in a video. In another example, the scene segmentation and object tracking systems and techniques can enable object tracking to improve autofocus stability for video. In yet another example, the scene segmentation and object tracking systems and techniques can allow tracking of one or more regions of interest (corresponding to one or more target objects) selected by object or saliency detection (e.g., face detection) for camera focus or other feature, such as for applying a blurring effect on the background.

As noted above, one or more of the engines, modules, or components described herein may be implemented using a machine learning system (e.g., one or more artificial intelligence algorithms, one or more machine learning models trained using training data input into one or more machine learning algorithms, one or more neural networks, or a combination thereof) to perform various aspects or examples of the present disclosure. FIG. 10 is a block diagram illustrating an example of a neural network 1000, in accordance with some examples. In some examples, the neural network 1000 of FIG. 10 may be used by the semantic backbone 210, the cross-attention engine 306, the prediction engine 308, the content classifier 830, and/or other engine or component described herein. For example, the neural network 1000 of FIG. 10 can be used to implement a machine learning based scene segmentation and object tracking system.

As shown in FIG. 10, an input layer 1020 includes input data. In one illustrative example, the input layer 1020 can include data representing the pixels of an input image or frame captured by one of the image capture and processing system 100. The image may be a video frame. The neural network 1000 includes multiple hidden layers 1022a, 1022b, through 1022n. The hidden layers 1022a, 1022b, through 1022n include "n" number of hidden layers, where "n" is an integer greater than or equal to one. The number of hidden layers can be made to include as many layers as needed for the given application. The neural network 1000 further includes an output layer 1024 that provides an output resulting from the processing performed by the hidden layers 1022a, 1022b, through 1022n. In one illustrative example, the output layer 1024 can provide a classification for an object in an input video frame. The classification can include a class identifying the type of object (e.g., a person, a dog, a cat, or other object). Based on the classification of type of object, the neural network 1000, or a device that interacts with the neural network 1000, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The neural network 1000 is a multi-layer neural network of interconnected nodes. Each node can represent a piece of information. Information associated with the nodes is shared among the different layers and each layer retains information as information is processed. In some cases, the neural network 1000 can include a feed-forward network, in which case there are no feedback connections where outputs of the network are fed back into itself. In some cases, the neural network 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1022a. For example, as shown, each of the input nodes of the input layer 1020 is connected to each of the nodes of the first hidden layer 1022a. The nodes of the first hidden layer 1022a can transform the information of each input node by applying activation functions to the input node information. The information derived from the transformation can then be passed to and can activate the nodes of the next hidden layer 1022b, which can perform their own designated functions. Example functions include convolutional, up-sampling, data transformation, and/or any other suitable functions. The output of the hidden layer 1022b can then activate nodes of the next hidden layer, and so on. The output of the last hidden layer 1022n can activate one or more nodes of the output layer 1024, at which an output is provided. In some cases, while nodes (e.g., node 1026) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. Once the neural network 1000 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1020 using the different hidden layers 1022a, 1022b, through 1022n in order to provide the output through the output layer 1024. In an example in which the neural network 1000 is used to identify objects in images, the neural network 1000 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1000 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1000 is trained well enough so that the weights of the layers are accurately tuned.

For the example of identifying objects in images, the forward pass can include passing a training image through the neural network 1000. The weights are initially randomized before the neural network 1000 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1000, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1000 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1000 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1000 can include any other deep network other than a CNN, such as an autoencoder, a deep belief nets (DBNs), a Recurrent Neural Networks (RNNs), among others.

FIG. 11 is a block diagram illustrating an example of a convolutional neural network (CNN) 1100, in accordance with some examples. In some examples, the CNN 1100 of FIG. 11 may be used by the semantic backbone 210, the cross-attention engine 306, the prediction engine 308, the content classifier 830, and/or other engine or component described herein. The input layer 1120 of the CNN 1100 includes data representing an image, such as an image captured by one of the image capture and processing system 100. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1122a, an optional non-linear activation layer, a pooling hidden layer 1122b, and fully connected hidden layers 1122c to get an output at the output layer 1124. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image. The classification can include a class identifying the type of object (e.g., a person, a dog, a cat, or other object). Based on the classification of type of object, the CNN 1100, or a device that interacts with the CNN 1100, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The first layer of the CNN 1100 is the convolutional hidden layer 1122a. The convolutional hidden layer 1122a analyzes the image data of the input layer 1120. Each node of the convolutional hidden layer 1122a is connected to a region of nodes (pixels) of the input image called a receptive field. The convolutional hidden layer 1122a can be considered as one or more filters (each filter corresponding to a different activation or feature map), with each convolutional iteration of a filter being a node or neuron of the convolutional hidden layer 1122a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1122a. Each connection between a node and a receptive field for that node learns a weight and, in some cases, an overall bias such that each node learns to analyze its particular local receptive field in the input image. Each node of the hidden layer 1122a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1122a is due to each node of the convolutional layer being applied to its corresponding receptive field. For example, a filter of the convolutional hidden layer 1122a can begin in the top-left corner of the input image array and can convolve around the input image. As noted above, each convolutional iteration of the filter can be considered a node or neuron of the convolutional hidden layer 1122a. At each convolutional iteration, the values of the filter are multiplied with a corresponding number of the original pixel values of the image (e.g., the 5×5 filter array is multipled by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1122a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1122a.

The mapping from the input layer to the convolutional hidden layer 1122a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1122a can include several activation maps in order to identify multiple features in an image. The example shown in FIG. 11 includes three activation maps. Using three activation maps, the convolutional hidden layer 1122a can detect three different kinds of features, with each feature being detectable across the entire image.

In some examples, a non-linear hidden layer can be applied after the convolutional hidden layer 1122a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1100 without affecting the receptive fields of the convolutional hidden layer 1122a.

The pooling hidden layer 1122b can be applied after the convolutional hidden layer 1122a (and after the non-linear hidden layer when used). The pooling hidden layer 1122b is used to simplify the information in the output from the convolutional hidden layer 1122a. For example, the pooling hidden layer 1122b can take each activation map output from the convolutional hidden layer 1122a and generates a condensed activation map (or feature map) using a pooling function. Max-pooling is one example of a function performed by a pooling hidden layer. Other forms of pooling functions be used by the pooling hidden layer 1122a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1122a. In the example shown in FIG. 11, three pooling filters are used for the three activation maps in the convolutional hidden layer 1122a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1122a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1122a having a dimension of 24×24 nodes, the output from the pooling hidden layer 1122b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1122*b* to every one of the output nodes in the output layer 1124. Using the example above, the input layer includes 28×28 nodes encoding the pixel intensities of the input image, the convolutional hidden layer 1122*a* includes 3×24×24 hidden feature nodes based on application of a 5×5 local receptive field (for the filters) to three activation maps, and the pooling hidden layer 1122*b* includes a layer of 3×12×12 hidden feature nodes based on application of max-pooling filter to 2×2 regions across each of the three feature maps. Extending this example, the output layer 1124 can include ten output nodes. In such an example, every node of the 3×12×12 pooling hidden layer 1122*b* is connected to every node of the output layer 1124.

The fully connected layer 1122*c* can obtain the output of the previous pooling hidden layer 1122*b* (which should represent the activation maps of high-level features) and determines the features that most correlate to a particular class. For example, the fully connected layer 1122*c* layer can determine the high-level features that most strongly correlate to a particular class, and can include weights (nodes) for the high-level features. A product can be computed between the weights of the fully connected layer 1122*c* and the pooling hidden layer 1122*b* to obtain probabilities for the different classes. For example, if the CNN 1100 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person). Since a person is considered a dynamic object, detection of a person is an example of detection of a dynamic object.

In some examples, the output from the output layer 1124 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 11-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
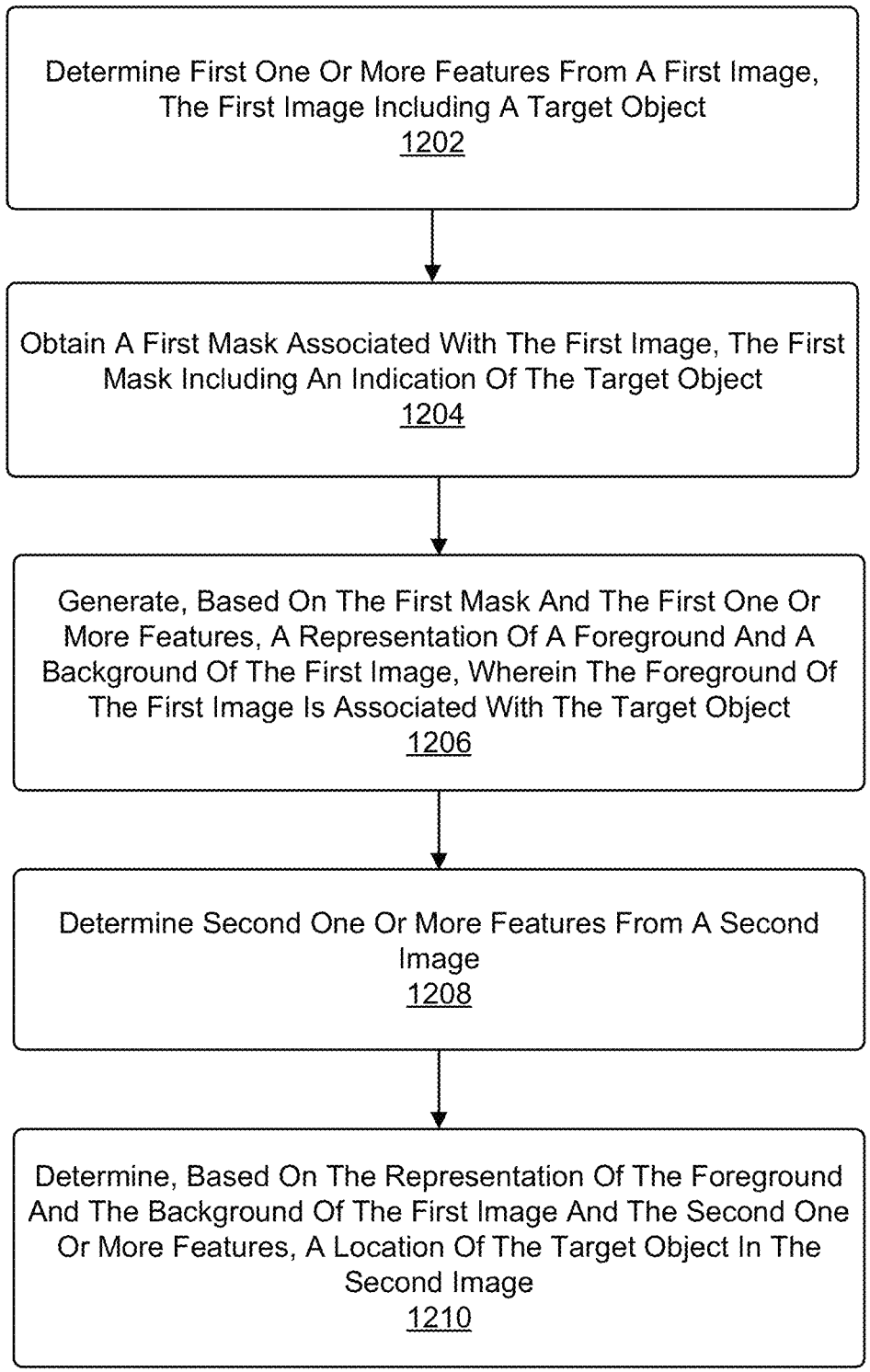
FIG. 12 is a flow diagram illustrating an example of a process for processing one or more frames, in accordance with some examples.

FIG. 12 is a flowchart illustrating an example of a process 1200 of processing image data using the techniques described herein. At block 1202, the process 1200 includes determining first one or more features from a first frame. The first frame includes a target object. In one illustrative example, the first frame is the initialization frame 201 of FIG. 2. In some aspects, as described herein, the process 1200 may include performing semantic segmentation of the first frame to generate a segmentation mask of the first frame. As described herein, the segmentation mask may include, for each pixel in the first frame, a respective indication of a respective segmentation class from multiple segmentation classes. The process 1200 may include classifying each pixel of the first frame into a respective segmentation class from the multiple segmentation classes. The process 1200 may further include determining an accuracy of the segmentation mask based on classifying each pixel of the first frame.

In some cases, the first one or more features from the first frame are based on semantic segmentation performed on the first frame (e.g., to generate the segmentation mask noted above). In some aspects, the semantic segmentation is performed using a machine learning system (e.g., the semantic backbone 210) to generate the segmentation mask (e.g., the segmentation mask 203). In such aspects, to determine the first one or more features from the first frame, the process 1200 may include extracting the first one or more features from the machine learning system based on performing the semantic segmentation. In some examples, the first one or more features extracted from the machine learning system include features having different scales.

At block 1204, the process 1200 includes obtaining a first mask associated with the first frame. The first mask includes an indication of the target object. In one illustrative example, the first mask is the foreground-background mask 205 of FIG. 2.

At block 1206, the process 1200 includes generating, based on the first mask and the first one or more features, a representation of a foreground and a background of the first frame. The foreground of the first frame is associated with the target object. In some aspects, the representation of the foreground and the background of the first frame includes a feature embedded as key-value pairs (e.g., key-value pairs 217 generated by the feature embedding engine 216 of FIG. 2). In some cases, to generate the representation of the foreground and the background of the first frame, the process 1200 may include combining the first mask with the first one or more features. For instance, in some examples, the first one or more features include features having different scales. In such examples, the process 1200 may include fusing (e.g., using the fusion engine 212 of FIG. 2) the features having the different scales into a fused feature. To generate the representation of the foreground and the background of the first frame, the process 1200 may further include combining (e.g., using the mask embedding engine 214 of FIG. 2) the first mask with the fused feature. As noted above, in some aspects, the first one or more features extracted from the machine learning system include features having different scales. In such aspects, the process 1200 may include fusing (e.g., using the fusion engine 212) the features (extracted from the machine learning system) having the different scales into a fused feature. As noted above, to generate the representation of the foreground and the background of the first frame, the process 1200 may include combining (e.g., using the mask embedding engine 214) the first mask with the fused feature (e.g., based on fusing the features extracted from the machine learning system having the different scales).

At block 1208, the process 1200 includes determining second one or more features from a second frame (e.g., using the semantic backbone 210 of FIG. 3). In one illustrative example, the second frame is the query frame 301 of FIG. 3. In some cases, the indication of the target object in the first mask includes an indication of a bounding box associated with the target object. In such cases, the process 1200 may include determining a location of the target object in the first frame and determining, based on the location of the target object determined in the first frame, a refined bounding box associated with the target object. An illustrative example of generating such a refined bounding box is described above with respect to FIG. 6.

At block 1210, the process 1200 includes determining (e.g., using the prediction engine 308 of FIG. 3), based on the representation of the foreground and the background of the first frame and the second one or more features, a location of the target object in the second frame. In some aspects, the process 1200 may include tracking (e.g., using the prediction engine 308 of FIG. 3) the target object based on the location of the target object determined in the second frame and at least one location of the target object in one or more additional frames.

In some aspects, the process 1200 may include determining (e.g., using the prediction engine 308 of FIG. 3) a second mask for the second frame and a bounding box for the target object. The second mask indicates a foreground and a background for the second frame. In one illustrative example, the second mask may include the predicted foreground-background mask 321 and the bounding box may include the bounding box 325 of FIG. 3. The process 1200 may include using the second mask for the second frame and the bounding box for the target object to update a feature memory based on the second one or more features of the second frame, as described herein. In some cases, the process 1200 may include filtering false positive pixels from the second mask using the bounding box determined for the target object, as described above.

In some examples, the process 1200 may include comparing (e.g., using the cross-attention engine 306 of FIG. 3) the representation of the foreground and the background of the first frame to the second one or more features and determining the representation of a foreground and a background of the second frame based on comparing the representation of the foreground and the background of the first frame to the second one or more features. The process 1200 may include determining (e.g., using the prediction engine 308 of FIG. 3) the location of the target object in the second frame based on the representation of the foreground and the background of the second frame.

In some cases, the process 1200 may include storing the representation of the first frame in a feature memory (e.g., the feature memory 204) and updating the feature memory with the second one or more features determined from the second frame. Illustrative examples of updating the feature memory are described herein, including with respect to FIG. 5. In one illustrative example, to update the feature memory, the process 1200 may include merging at least one feature of the second one or more features with at least one feature associated with a third frame (e.g., to generate a merged feature, such as merged key-value pair 507 of FIG. 5). In another alternative or additional illustrative example, to update the feature memory, the process 1200 may include adding at least one feature of the second one or more features to the feature memory (e.g., a new feature, such as new key-value pair 506 or new key-value pair 508 of FIG. 5). In another alternative or additional illustrative example, to update the feature memory, the process 1200 may include removing at least one feature associated with a third frame from the feature memory based on a storage limit of the feature memory. In some cases, the process 1200 may update the feature memory with the second one or more features determined from the second frame based on an uncertainty of the second one or more features being less than an uncertainty threshold. In some aspects, features associated with the representation of the first frame are maintained in the feature memory (e.g., the features associated with the representation of the first frame are not removed from the feature memory when an update occurs). In some examples, the process 1200 may include determining a confidence associated with determining the location of the target object in the second frame is less than a confidence threshold (e.g., 0.80 or 80%, 0.85 or 85%, 0.9 or 90%, or other confidence threshold). The process 1200 may further include determining, based on determining the confidence is less than the confidence threshold, not to update the feature memory with the second one or more features determined from the second frame.

In some examples, the processes described herein (e.g., process 1200 and/or other process described herein) may be performed by a computing device or apparatus. In one example, the process 1200 can be performed by the scene segmentation and object tracking system 100 of FIG. 1 and/or other system described herein (the scene segmentation and object tracking system 200 of FIG. 2, the scene segmentation and object tracking system 300 of FIG. 3, etc.). In another example, the process 1200 can be performed by the computing system 1300 (e.g., implementing by the scene segmentation and object tracking system 100 and/or other system described herein) shown in FIG. 13.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1200. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
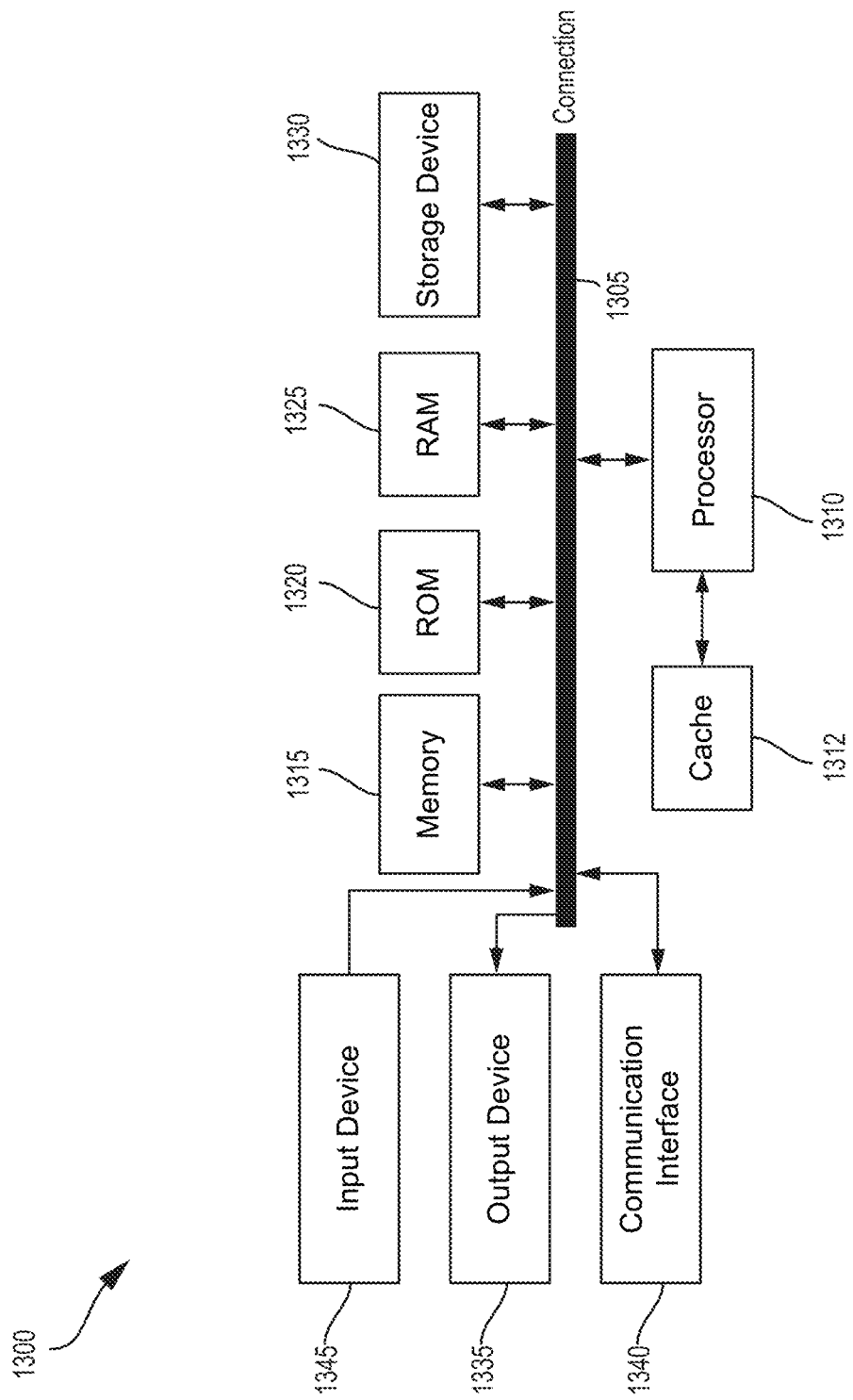
FIG. 13 is a diagram illustrating an example of a system for implementing certain aspects described herein.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that couples various system components including a memory unit 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method of processing one or more frames, the method comprising: determining first one or more features from a first frame, the first frame including a target object; obtaining a first mask associated with the first frame, the first mask including an indication of the target object; generating, based on the first mask and the first one or more features, a representation of a foreground and a background of the first frame, wherein the foreground of the first frame is associated with the target object; determining second one or more features from a second frame; and determining, based on the representation of the foreground and the background of the first frame and the second one or more features, a location of the target object in the second frame.

Aspect 2. The method of Aspect 1, wherein the representation of the foreground and the background of the first frame includes a feature embedded as key-value pairs.

Aspect 3. The method of any of Aspects 1 or 2, wherein generating the representation of the foreground and the background of the first frame comprises: combining the first mask with the first one or more features.

Aspect 4. The method of any of Aspects 1 to 3, wherein the first one or more features include features having different scales, and further comprising: fusing the features having the different scales into a fused feature.

Aspect 5. The method of any of Aspects 1 to 4, further comprising: performing semantic segmentation of the first frame to generate a segmentation mask of the first frame.

Aspect 6. The method of Aspect 5, wherein the segmentation mask includes, for each pixel in the first frame, a respective indication of a respective segmentation class from multiple segmentation classes, further comprising: classifying each pixel of the first frame into a respective segmentation class from the multiple segmentation classes; and determining an accuracy of the segmentation mask based on classifying each pixel of the first frame.

Aspect 7. The method of any of Aspects 5 or 6, wherein the first one or more features from the first frame are based on the semantic segmentation.

Aspect 8. The method of any of Aspects 5 to 7, wherein the semantic segmentation is performed using a machine learning system, wherein determining the first one or more features from the first frame comprises: extracting the first one or more features from the machine learning system based on performing the semantic segmentation.

Aspect 9. The method of Aspect 8, wherein the first one or more features extracted from the machine learning system include features having different scales, and further comprising: fusing the features having the different scales into a fused feature.

Aspect 10. The method of Aspect 9, wherein generating the representation of the foreground and the background of the first frame comprises: combining the first mask with the fused feature.

Aspect 11. The method of any of Aspects 1 to 10, further comprising: tracking the target object based on the location of the target object determined in the second frame and at least one location of the target object in one or more additional frames.

Aspect 12. The method of any of Aspects 1 to 11, further comprising: determining a second mask for the second frame and a bounding box for the target object, wherein the second mask indicates a foreground and a background for the second frame.

Aspect 13. The method of Aspect 12, further comprising: filtering false positive pixels from the second mask using the bounding box determined for the target object.

Aspect 14. The method of any of Aspects 1 to 13, wherein determining, based on the representation of the foreground and the background of the first frame and the second one or more features, the location of the target object in the second frame comprises: comparing the representation of the foreground and the background of the first frame to the second one or more features; determining the representation of a foreground and a background of the second frame based on comparing the representation of the foreground and the background of the first frame to the second one or more features; and determining the location of the target object in the second frame based on the representation of the foreground and the background of the second frame.

Aspect 15. The method of any of Aspects 1 to 14, further comprising: storing the representation of the first frame in a feature memory; and updating the feature memory with the second one or more features determined from the second frame.

Aspect 16. The method of Aspect 15, wherein updating the feature memory comprises: merging at least one feature of the second one or more features with at least one feature associated with a third frame.

Aspect 17. The method of any of Aspects 15 or 16, wherein updating the feature memory comprises: adding at least one feature of the second one or more features to the feature memory.

Aspect 18. The method of any of Aspects 15 to 17, wherein updating the feature memory comprises: removing at least one feature associated with a third frame from the feature memory based on a storage limit of the feature memory.

Aspect 19. The method of any of Aspects 15 to 18, wherein the feature memory is updated with the second one or more features determined from the second frame based on an uncertainty of the second one or more features being less than an uncertainty threshold.

Aspect 20. The method of any of Aspects 15 to 19, wherein features associated with the representation of the first frame are maintained in the feature memory.

Aspect 21. The method of any of Aspects 1 to 20, further comprising: determining a confidence associated with determining the location of the target object in the second frame is less than a confidence threshold; and determining, based on determining the confidence is less than the confidence threshold, not to update a feature memory with the second one or more features determined from the second frame.

Aspect 22. The method of any of Aspects 1 to 21, wherein the indication of the target object in the first mask includes an indication of a bounding box associated with the target object, and further comprising: determining a location of the target object in the first frame; and determining, based on the location of the target object determined in the first frame, a refined bounding box associated with the target object.

Aspect 23. An apparatus for processing one or more frames, the apparatus comprising: at least one memory; and at least one processor coupled to the at least one memory and configured to: determine first one or more features from a first frame, the first frame including a target object; obtain a first mask associated with the first frame, the first mask including an indication of the target object; generate, based on the first mask and the first one or more features, a representation of a foreground and a background of the first frame, wherein the foreground of the first frame is associated with the target object; determine second one or more features from a second frame; and determine, based on the representation of the foreground and the background of the first frame and the second one or more features, a location of the target object in the second frame.

Aspect 24. The apparatus of Aspect 23, wherein the representation of the foreground and the background of the first frame includes a feature embedded as key-value pairs.

Aspect 25. The apparatus of any of Aspects 23 or 24, wherein, to generate the representation of the foreground and the background of the first frame, the at least one processor is configured to: combine the first mask with the first one or more features.

Aspect 26. The apparatus of any of Aspects 23 to 25, wherein the first one or more features include features having different scales, and wherein the at least one processor is configured to: fuse the features having the different scales into a fused feature.

Aspect 27. The apparatus of any of Aspects 23 to 26, wherein the at least one processor is configured to: perform semantic segmentation of the first frame to generate a segmentation mask of the first frame.

Aspect 28. The apparatus of Aspect 27, wherein the segmentation mask includes, for each pixel in the first frame, a respective indication of a respective segmentation class from multiple segmentation classes, and wherein the at least one processor is configured to: classify each pixel of the first frame into a respective segmentation class from the multiple segmentation classes; and determine an accuracy of the segmentation mask based on classifying each pixel of the first frame.

Aspect 29. The apparatus of any of Aspects 27 or 28, wherein the first one or more features from the first frame are based on the semantic segmentation.

Aspect 30. The apparatus of any of Aspects 27 to 29, wherein the semantic segmentation is performed using a machine learning system, and wherein, to determine the first one or more features from the first frame, the at least one processor is configured to: extract the first one or more features from the machine learning system based on performing the semantic segmentation.

Aspect 31. The apparatus of Aspect 30, wherein the first one or more features extracted from the machine learning system include features having different scales, and wherein the at least one processor is configured to: fuse the features having the different scales into a fused feature.

Aspect 32. The apparatus of Aspect 31, wherein, to generate the representation of the foreground and the background of the first frame, the at least one processor is configured to: combine the first mask with the fused feature.

Aspect 33. The apparatus of any of Aspects 23 to 32, wherein the at least one processor is configured to: track the target object based on the location of the target object determined in the second frame and at least one location of the target object in one or more additional frames.

Aspect 34. The apparatus of any of Aspects 23 to 33, wherein the at least one processor is configured to: determine a second mask for the second frame and a bounding box for the target object, wherein the second mask indicates a foreground and a background for the second frame.

Aspect 35. The apparatus of Aspect 34, wherein the at least one processor is configured to: filter false positive pixels from the second mask using the bounding box determined for the target object.

Aspect 36. The apparatus of any of Aspects 23 to 35, wherein, to determine, based on the representation of the foreground and the background of the first frame and the second one or more features, the location of the target object in the second frame, the at least one processor is configured to: compare the representation of the foreground and the background of the first frame to the second one or more features; determine the representation of a foreground and a background of the second frame based on comparing the representation of the foreground and the background of the first frame to the second one or more features; and determine the location of the target object in the second frame based on the representation of the foreground and the background of the second frame.

Aspect 37. The apparatus of any of Aspects 23 to 36, wherein the at least one processor is configured to: store the representation of the first frame in a feature memory; and update the feature memory with the second one or more features determined from the second frame.

Aspect 38. The apparatus of Aspect 37, wherein, to update the feature memory, the at least one processor is configured to: merging at least one feature of the second one or more features with at least one feature associated with a third frame.

Aspect 39. The apparatus of any of Aspects 37 or 38, wherein, to update the feature memory, the at least one processor is configured to: adding at least one feature of the second one or more features to the feature memory.

Aspect 40. The apparatus of any of Aspects 37 to 39, wherein, to update the feature memory, the at least one processor is configured to: removing at least one feature associated with a third frame from the feature memory based on a storage limit of the feature memory.

Aspect 41. The apparatus of any of Aspects 37 to 40, wherein the at least one processor is configured to update the feature memory with the second one or more features determined from the second frame based on an uncertainty of the second one or more features being less than an uncertainty threshold.

Aspect 42. The apparatus of any of Aspects 37 to 41, wherein features associated with the representation of the first frame are maintained in the feature memory.

Aspect 43. The apparatus of any of Aspects 23 to 42, wherein the at least one processor is configured to: determine a confidence associated with determining the location of the target object in the second frame is less than a confidence threshold; and determine, based on determining the confidence is less than the confidence threshold, not to update a feature memory with the second one or more features determined from the second frame.

Aspect 44. The apparatus of any of Aspects 23 to 43, wherein the indication of the target object in the first mask includes an indication of a bounding box associated with the target object, and wherein the at least one processor is configured to: determine a location of the target object in the first frame; and determine, based on the location of the target object determined in the first frame, a refined bounding box associated with the target object.

Aspect 45. The apparatus of any of Aspects 23 to 43, wherein the apparatus is a mobile device.

Aspect 46. The apparatus of any of Aspects 23 to 43, wherein the apparatus is an extended reality (XR) device.

Aspect 47. A non-transitory computer-readable medium having stored thereon instructions that, when executed by one or more processors, cause the one or more processors to perform operations according to any of Aspects 1 to 46.

Aspect 48. An apparatus for processing one or more frames comprising means for performing operations according to any of Aspects 1 to 46.

What is claimed is:
1. An apparatus of processing one or more frames, the apparatus comprising:
at least one memory; and
at least one processor coupled to the at least one memory and configured to:
determine first one or more features from a first frame, the first frame including a target object;
obtain a first mask associated with the first frame, the first mask including an indication of the target object;
generate, based on the first mask and the first one or more features, a representation of a foreground and a background of the first frame, wherein the foreground of the first frame is associated with the target object;
determine second one or more features from a second frame; and
determine, based on the representation of the foreground and the background of the first frame and the second one or more features, a location of the target object in the second frame.
2. The apparatus of claim 1, wherein the representation of the foreground and the background of the first frame includes a feature embedded as key-value pairs.

3. The apparatus of claim 1, wherein, to generate the representation of the foreground and the background of the first frame, the at least one processor is configured to:
  combine the first mask with the first one or more features.

4. The apparatus of claim 1, wherein the first one or more features include features having different scales, and the at least one processor is configured to:
  fuse the features having the different scales into a fused feature.

5. The apparatus of claim 1, wherein the at least one processor is configured to:
  perform semantic segmentation of the first frame to generate a segmentation mask of the first frame.

6. The apparatus of claim 5, wherein the segmentation mask includes, for each pixel in the first frame, a respective indication of a respective segmentation class from multiple segmentation classes, and wherein the at least one processor is configured to:
  classifying each pixel of the first frame into a respective segmentation class from the multiple segmentation classes; and
  determining an accuracy of the segmentation mask based on classifying each pixel of the first frame.

7. The apparatus of claim 5, wherein the first one or more features from the first frame are based on the semantic segmentation.

8. The apparatus of claim 5, wherein the semantic segmentation is performed using a machine learning system, and wherein, to determine the first one or more features from the first frame, the at least one processor is configured to:
  extract the first one or more features from the machine learning system based on performing the semantic segmentation.

9. The apparatus of claim 8, wherein the first one or more features extracted from the machine learning system include features having different scales, and wherein the at least one processor is configured to:
  fuse the features having the different scales into a fused feature.

10. The apparatus of claim 9, wherein, to generate the representation of the foreground and the background of the first frame, the at least one processor is configured to:
  combine the first mask with the fused feature.

11. The apparatus of claim 1, wherein the at least one processor is configured to:
  track the target object based on the location of the target object determined in the second frame and at least one location of the target object in one or more additional frames.

12. The apparatus of claim 1, wherein the at least one processor is configured to:
  determine a second mask for the second frame and a bounding box for the target object, wherein the second mask indicates a foreground and a background for the second frame.

13. The apparatus of claim 12, wherein the at least one processor is configured to:
  filter false positive pixels from the second mask using the bounding box determined for the target object.

14. The apparatus of claim 1, wherein, to determine, based on the representation of the foreground and the background of the first frame and the second one or more features, the location of the target object in the second frame, the at least one processor is configured to:
  comparing the representation of the foreground and the background of the first frame to the second one or more features;
  determining the representation of a foreground and a background of the second frame based on comparing the representation of the foreground and the background of the first frame to the second one or more features; and
  determining the location of the target object in the second frame based on the representation of the foreground and the background of the second frame.

15. The apparatus of claim 1, wherein the at least one processor is configured to:
  store the representation of the first frame in a feature memory; and
  update the feature memory with the second one or more features determined from the second frame.

16. The apparatus of claim 15, wherein, to update the feature memory, the at least one processor is configured to:
  merging at least one feature of the second one or more features with at least one feature associated with a third frame.

17. The apparatus of claim 15, wherein, to update the feature memory, the at least one processor is configured to:
  adding at least one feature of the second one or more features to the feature memory.

18. The apparatus of claim 15, wherein, to update the feature memory, the at least one processor is configured to:
  removing at least one feature associated with a third frame from the feature memory based on a storage limit of the feature memory.

19. The apparatus of claim 15, wherein the at least one processor is configured to update the feature memory with the second one or more features determined from the second frame based on an uncertainty of the second one or more features being less than an uncertainty threshold.

20. The apparatus of claim 15, wherein features associated with the representation of the first frame are maintained in the feature memory.

21. The apparatus of claim 1, wherein the at least one processor is configured to:
  determine a confidence associated with determining the location of the target object in the second frame is less than a confidence threshold; and
  determine, based on determining the confidence is less than the confidence threshold, not to update a feature memory with the second one or more features determined from the second frame.

22. The apparatus of claim 1, wherein the indication of the target object in the first mask includes an indication of a bounding box associated with the target object, and wherein the at least one processor is configured to:
  determine a location of the target object in the first frame; and
  determine, based on the location of the target object determined in the first frame, a refined bounding box associated with the target object.

23. A method of processing one or more frames, the method comprising:
  determining first one or more features from a first frame, the first frame including a target object;
  obtaining a first mask associated with the first frame, the first mask including an indication of the target object;
  generating, based on the first mask and the first one or more features, a representation of a foreground and a background of the first frame, wherein the foreground of the first frame is associated with the target object;
  determining second one or more features from a second frame; and determining, based on the representation of the foreground and the background of the first frame and the second one or more features, a location of the target object in the second frame.

24. The method of claim 23, wherein generating the representation of the foreground and the background of the first frame comprises:
combining the first mask with the first one or more features.

25. The method of claim 23, wherein the first one or more features include features having different scales, and further comprising:
fusing the features having the different scales into a fused feature.

26. The method of claim 23, further comprising:
performing semantic segmentation of the first frame to generate a segmentation mask of the first frame.

27. The method of claim 26, wherein the first one or more features from the first frame are based on the semantic segmentation.

28. The method of claim 26, wherein the semantic segmentation is performed using a machine learning system, wherein determining the first one or more features from the first frame comprises:
extracting the first one or more features from the machine learning system based on performing the semantic segmentation.

29. The method of claim 23, wherein determining, based on the representation of the foreground and the background of the first frame and the second one or more features, the location of the target object in the second frame comprises:
comparing the representation of the foreground and the background of the first frame to the second one or more features;
determining the representation of a foreground and a background of the second frame based on comparing the representation of the foreground and the background of the first frame to the second one or more features; and
determining the location of the target object in the second frame based on the representation of the foreground and the background of the second frame.

30. The method of claim 23, further comprising:
storing the representation of the first frame in a feature memory; and
updating the feature memory with the second one or more features determined from the second frame.

* * * * *